United States Patent
Ishida

(10) Patent No.: US 6,725,413 B1
(45) Date of Patent: Apr. 20, 2004

(54) DATA TRANSFER CONTROL DEVICE AND ELECTRONIC EQUIPMENT

(75) Inventor: Takuya Ishida, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 295 days.

(21) Appl. No.: 09/787,129

(22) PCT Filed: Jul. 12, 2000

(86) PCT No.: PCT/JP00/04638

§ 371 (c)(1),
(2), (4) Date: Mar. 14, 2001

(87) PCT Pub. No.: WO01/06711

PCT Pub. Date: Jan. 25, 2001

(30) Foreign Application Priority Data

Jul. 15, 1999 (JP) .......................................... 11-201249

(51) Int. Cl.$^7$ ............................................. H03M 13/00
(52) U.S. Cl. ........................................ 714/758; 714/746
(58) Field of Search ................................ 714/758, 746; 705/61; 370/392

(56) References Cited

U.S. PATENT DOCUMENTS

| 4,907,271 A | * | 3/1990 | Gilham ........................ 705/61 |
| 6,018,816 A | * | 1/2000 | Tateyama .................... 714/746 |
| 6,185,207 B1 | * | 2/2001 | LaBerge et al. ............. 370/392 |

FOREIGN PATENT DOCUMENTS

| JP | A 5-227180 | 9/1993 |
| JP | A 6-350611 | 12/1994 |
| JP | A 8-79223 | 3/1996 |
| JP | A 11-017711 | 1/1999 |

OTHER PUBLICATIONS

New US National Stage of PCT/JP00/04639, Ishida et al., filed Mar. 15, 2001.
U.S. patent application Ser. No. 09/787,077, Ishida et al., filed Mar. 14, 2001.
U.S. patent application Ser. No. 09/737,760, Matsunaga et al., filed Dec. 18, 2000.

* cited by examiner

*Primary Examiner*—Albert Decady
*Assistant Examiner*—Dipakkumar Gandhi
(74) *Attorney, Agent, or Firm*—Oliff & Berridge, PLC

(57) ABSTRACT

An objective of the present invention is to provide a data transfer control device and electronic equipment that reduce the processing overheads of firmware and enable the implementation of high-speed data transfer. When a header CRC error occurs in a data transfer control device in accordance with the IEEE 1394 standard, the header pointer returns to the previous position to invalidate that packet. When Unktcode occurs, the packet is not written to RAM and the packet is invalidated. No reception completed status is generated. A register for holding the header CRC error status is provided. When there is a data CRC error, a data pointer returns the previous position without returning the header pointer. A first mode in which received broadcast packets are invalidated and a second mode in which they are validated may be set so that when a broadcast packet is received in the first mode, that packet is not written to RAM.

13 Claims, 22 Drawing Sheets

FIG.11

| TAG(DTAG) | MEANING |
|---|---|
| 0001 | FW−SOP |
| 0010 | FW−HDR |
| 0011 | FW−FTR |
| 0100 | FW−ORB |
| 0101 | FW−STRM |
| 1001 | HW−SOP |
| 1010 | HW−HDR |
| 1011 | HW−FTR |
| 1100 | HW−ORB |
| 1101 | HW−STRM |

FW ······ FIRMWARE
HW ······ HARDWARE
SOP ······ START OF PACKET
(INITIAL QUADLET OF RECEIVED PACKET)
HDR ······ HEADER OTHER THAN SOP
FTR ······ STATUS INFORMATION FOR THE TRANSMITTED PACKET
ORB ······ ORB (DATA)
STRM ······ STREAM (DATA)

HEADER CRC ERROR

DATA CRC ERROR

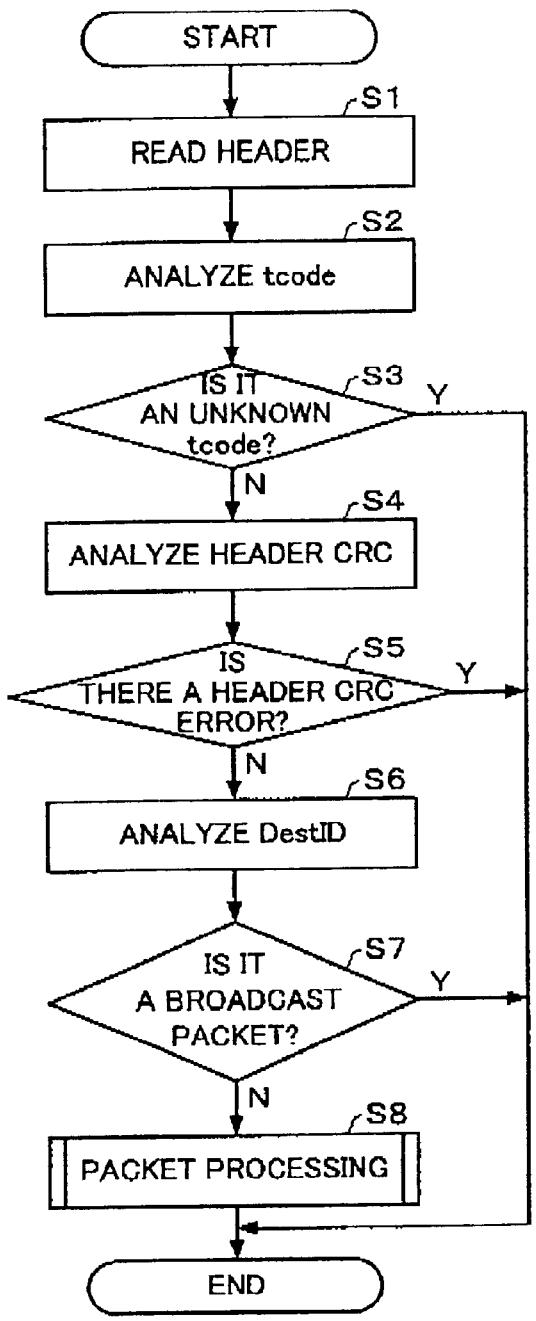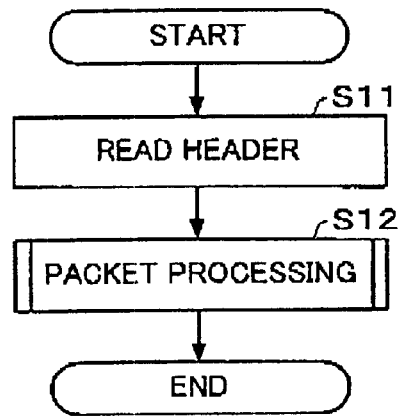
FIG.19A COMPARATIVE EXAMPLE
FIG.19B THIS EMBODIMENT

COMPARATIVE EXAMPLE

THIS EMBODIMENT

DATA TRANSFER CONTROL DEVICE AND ELECTRONIC EQUIPMENT

TECHNICAL FIELD

The present invention relates to a data transfer control device and electronic equipment, and, in particular, to a data transfer control device and electronic equipment for performing data transfer that is based on a standard such as IEEE 1394 between a plurality of nodes that are connected by a bus.

BACKGROUND OF ART

An interface standard called IEEE 1394 has recently been attracting much attention. This IEEE 1394 lays down standards for high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-RW drives, and hard disk drives, but also to domestic appliances such as video cameras, VTRs, and TVs. This standard is therefore expected to enable a dramatic acceleration of the digitalization of electronic equipment.

However, it has become clear that there are some technical problems that can occur in a data transfer control device in accordance with IEEE 1394, as described below.

That is to say, the current IEEE 1394 standard does make it possible to implement transfer speeds up to a maximum of 400 Mbps. In practice, however, the presence of processing overheads forces the actual transfer speeds of the entire system to be much slower. In other words, the firmware and application software running on a CPU require large amounts of time for processes such as preparing to receive data and fetching the receive data, which means it is not possible to implement high-speed data transfer overall, no matter how fast the data can be transferred over the buses.

A particular problem lies in the fact that a CPU incorporated into peripheral equipment has a lower processing capability than the CPU incorporated into the host system, such as a personal computer. This makes the problem of processing overheads in the firmware and application software extremely serious. It is therefore desirable to provide techniques that are capable of efficiently solving this overhead problem.

DISCLOSURE OF INVENTION

The present invention was devised in the light of the above described problems and has as an objective thereof the provision of a data transfer control device that makes it possible to reduce processing overheads in firmware or the like and implement high-speed data transfer with a compact hardware configuration, and electronic equipment using the same.

In order to solve the above described problems, a data transfer control device of the present invention for performing data transfer in accordance with the IEEE 1394 standard between a plurality of nodes connected to abus comprises: a link circuit that provides a service for packet transfer between the nodes; and a write circuit that writes a packet, which has been received through the link circuit, to a packet storage means which is randomly accessible, wherein the link circuit performs processing to check a header CRC or a transaction code included within a header of the packet received from another node and, performs processing to invalidate the packet when it is determined that there is a CRC error in the header of the packet or when it is determined that the transaction code of the packet is an unknown code.

This aspect of the present invention makes it possible for the link circuit to perform processing to invalidate (i.e., cancel) a packet when there is a CRC error in the header of that packet or when the transaction code of the packet is unknown. This makes it unnecessary for the firmware to perform any processing on that packet. As a result, processing load on the firmware can be reduced, enabling an increase in the data transfer speed.

When it is determined that there is a CRC error in the header of the packet, the packet may be invalidated by returning a header pointer indicating a received header position within a header area of the packet storage means, to a position indicated by the header pointer at a completion of a previous packet reception. This makes it possible to invalidate the packet by the simple process of returning the header pointer, even if a first part of the header has already been written to the packet storage means.

The data transfer control device may further comprise means for storing status information indicating that the header CRC brror has occurred. The data transfer control device may further comprise means for storing status information indicating that the packet with an unknown code has been received. This makes it possible to inform the firmware of statuses, when the firmware should need to know that a header CRC error has occurred or that a packet with an unknown code has been received.

When it is determined that the transaction code of the packet is an unknown code, the packet may be invalidated by ensuring that the packet is not written to the packet storage means. This makes it possible to reduce the processing load on the firmware by not saving that packet.

No reception completed status may be generated when it is determined that there is the CRC error in the header of the packet or when it is determined that the transaction code of the packet is an unknown code. This makes it unnecessary for the firmware to perform interrupt processing, preventing wasteful processing of the firmware.

A data transfer control device of the present invention for performing data transfer in accordance with the IEEE 1394 standard between a plurality of nodes connected to a bus comprises: a link circuit that provides a service for packet transfer between the nodes; and a write circuit that writes a packet, which has been received through the link circuit, to a packet storage means which is randomly accessible, wherein the link circuit performs processing to check a data CRC included within data of the packet received from another node and, performs processing to validate the header of the packet and invalidate the data of the packet when it is determined that there is a CRC error in the data of the packet.

This aspect of the present invention makes it possible for the link circuit to perform processing when a data CRC error occurs, such that the header of that packet is validated but the data alone is invalidated. This makes it unnecessary to perform processing to read that data, reducing the processing load on the firmware. This configuration by which the header is not invalidated but is left as is ensures that the firmware can perform suitable processing for when a data CRC error occurs.

When it is determined that there is the CRC error in data of the packet, the data may be invalidated by returning a data pointer indicating a received data position within a data area of the packet storage means, to a position indicated by the data pointer at a completion of a previous packet reception, without returning a header pointer indicating a received header position within a header area of the packet storage means. This makes it possible to invalidate a packet by the simple process of returning the data pointer.

A data transfer control device of the present invention for performing data transfer in accordance with the IEEE 1394 standard between a plurality of nodes connected to a bus comprises: a link circuit that provides a service for packet transfer between the nodes; a write circuit that writes a packet, which has been received through the link circuit, to a packet storage means which is randomly accessible; and means which sets a first mode, in which a received broadcast packet is invalidated, and a second mode, in which the received broadcast packet is validated, wherein the link circuit performs processing to check a destination ID included in a header of the packet received from another node and, performs processing to invalidate the packet when it is determined that the packet is the broadcast packet and the first mode has been set.

This aspect of the present invention makes it possible to select operation in either a first mode in which received broadcast packets are invalidated or a second mode in which they are validated, further increasing the universality of the data transfer control device. If a broadcast packet is received when the first mode has been set, the link circuit performs processing to invalidate that packet. This makes it possible to avoid wasteful processing and to increase the data transfer speed.

When it is determined that the packet is the broadcast packet and the first mode has been set, the packet may be invalidated by not writing the packet to the packet storage means. This makes it possible to avoid wasteful processing by not performing processing to write to the packet storage means.

Electronic equipment according to the present invention comprises any one of the above described data transfer control devices; a device which performs given processing on data that has been received from another node through the data transfer control device and a bus; and a device for outputting or storing data that has been subjected to processing. And, a device which performs given processing on data that is to be transferred to another node through the data transfer control device and a bus; and a device which takes in data to be subjected to processing.

These aspects of the present invention make it possible to increase the speeds of processing within the electronic equipment for outputting or storing data that has been transferred from another node, or of processing within the electronic equipment for transferring data, which was taken in to the electronic equipment, to another node. Since these aspects of the present invention also make it possible to reduce the size of the data transfer control device and also reduce the processing load on the firmware or the like, electronic equipment can be made less expensive and more compact.

BRIEF DESCRIPTION OF DRAWINGS

FIG. 11 illustrates TAG.

FIGS. 19A and 19B are flowcharts of the processing performed by the firmware in a comparative example and this embodiment of the invention.

BEST MODE FOR CARRYING OUT THE INVENTION

Preferred embodiments of the present invention are described below with reference to the accompanying drawings.

1. IEEE 1394

The description first relates to an outline of IEEE 1394.

1.1 Outline

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

IEEB 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

Figure 1:
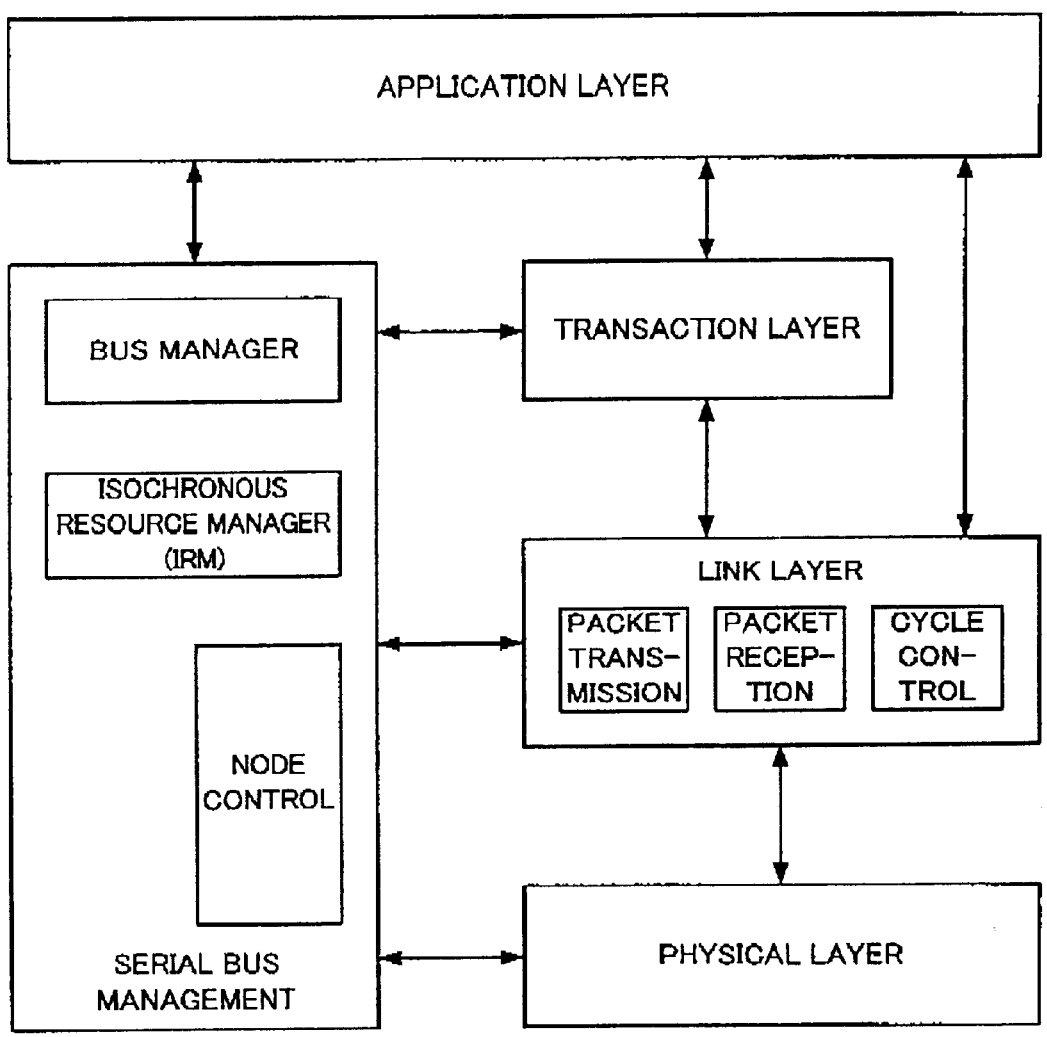
FIG. 1 shows the layer structure of IEEE 1394.

The layer structure (protocol structure) covered by IEEE 1394 is shown in FIG. 1.

The IEEE 1394 protocol is configured of a transaction layer, a link layer, and a physical layer. A serial bus management function monitors and controls the transaction layer, link, and physical layer, and provides various functions for controlling nodes and managing bus resources.

The transaction layer provides an interface (service) for transaction units within upper layers and a link layer for lower layers, and executes transactions such as read transactions, write transactions, and lock transactions.

In this case, a read transaction causes data to be transmitted from the responding node to the node that requested the data. Similarly, a write transaction causes data to be transmitted from the requesting node to the responding node. A lock transaction causes data to be transmitted from the requesting node to the responding node, and the responding node then processes that data and returns it to the requesting node.

The link layer provides functions such as addressing, data check, data framing for packet transmission/reception, and cycle control for isochronous transfer.

The physical layer converts the logical symbols used by the link layer into electrical signals, performs bus arbitration, and defines the physical bus interface.

Figure 2:
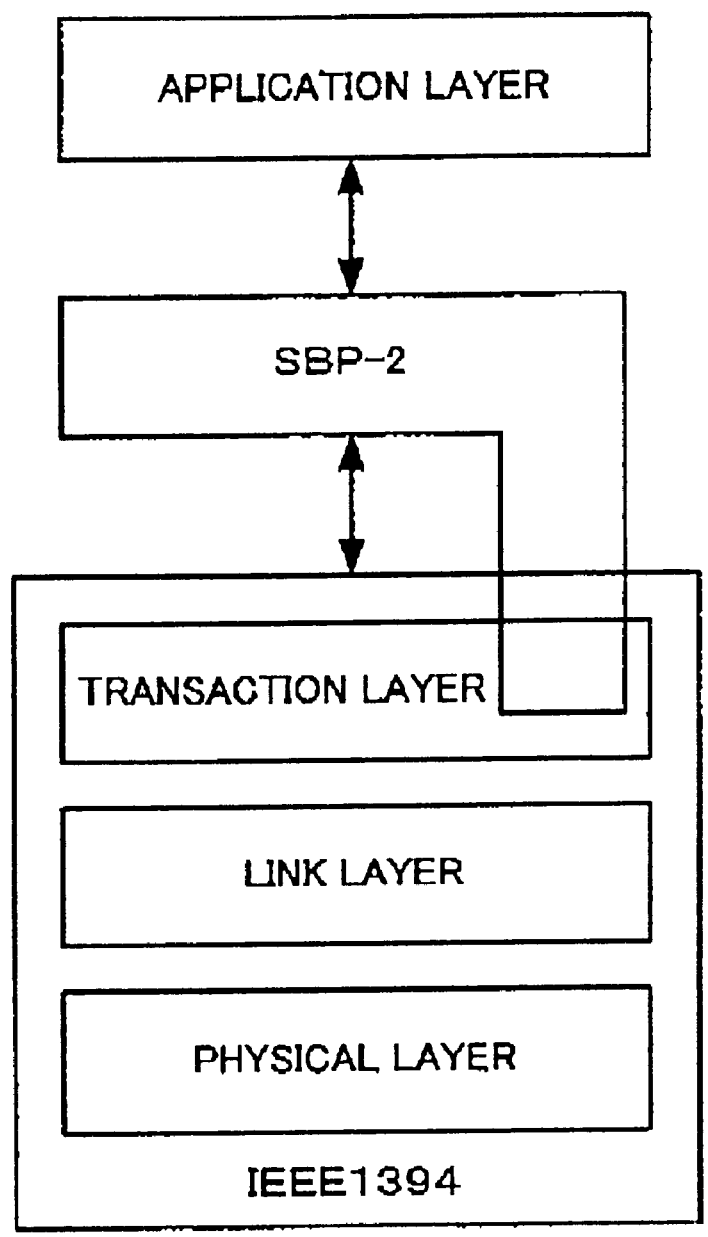
FIG. 2 illustrates the SBP-2.

Note that a protocol called the serial bus protocol 2 (SBP-2) has been proposed as a higher-order protocol that comprises some of the functions of the transaction layer under IEEE 1394, as shown in FIG. 2.

In this case, SBP-2 is proposed in order to enable utilization of the SCSI command set on top of the IEEE 1394 protocol. Use of this SBP-2 minimizes the changes to be made to the SCSI command set that is used in electronic equipment that conforms to the existing SCSI standards, and also enables their use in electronic equipment that conforms to the IEEE 1394 standard. The design and development of electronic equipment can be simplified thereby. Since it is also possible to encapsulate device-specific commands, not just SCSI commands, this greatly increases the universality of the command set.

With SBP-2, log-in processing is done by first using an operation requestblock (ORB) for initializing a log-in or fetch agent, which is created by an initiator (such as a personal computer. The initiator then creates an ORB (command block ORB) comprising a command (such as a read command and write command), then informs the target of the address of the thus created ORB. The target acquires the ORB created by the initiator by fetching from that address. If the command within the ORB was a read command, the target executes a block write transaction to transmit data from the target to the data buffer (memory) of the initiator. If the command within the ORB was a write command, on the other hand, the target executes a block read transaction to receive data from the data buffer of the initiator.

With this SBP-2, the target can execute a transaction to send or receive data when its own circumstances allow. Since it is therefore not necessary for the initiator and the target to operate in synchronism, the efficiency of data transfer can be increased.

Note that protocols other than SBP-2 are also being proposed as protocols of a higher order than IEEE 1394, such as the function control protocol (PCP).

1.3 Packet Format

Figure 3:
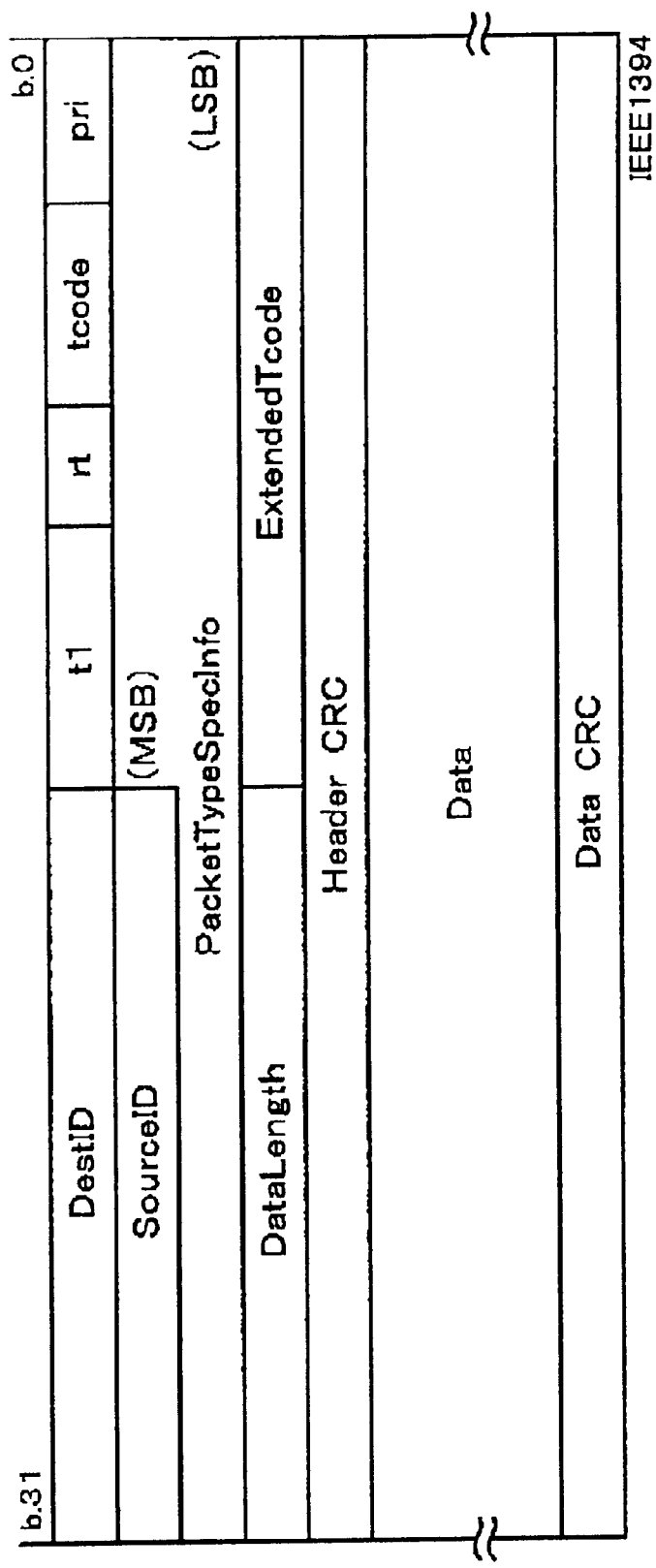
FIG. 3 shows the format of a packet having block data in asynchronous transfer, in accordance with the IEEE 1394 standard.

The format of a packet having block data in asynchronous transfer, in accordance with the IEEE 1394 standard is shown in In FIG. 3, DestID (destination ID) denotes an ID for identifying the node that is the transmission destination and t1 is a label for identifying the transaction. In addition, rt is a code for retry, tcode is a code for identifying the packet format and transaction type, pri denotes the priority, and the SourceID is for identifying the node that originated the transmission.

The Header CRC is a code for detecting a cyclic redundancy check (CRC) error in the header, and the Data CRC is a code for detecting a CRC error in the data. The configuration is such that errors in the header or data can be detected by using CRC on redundant bits that are attached to the header and data.

1.4 Broadcast

Addressing under the IEEE 1394 has a 64-bit width, with the high-order 16 bits being the node ID. The upper 10 bits of this node ID are a BUS_ID for bus identification and the lower 6 bits are a PHY_ID for identifying the node. A packet in which the PHY_ID (lower 6 bits) of the DestID are 0×3P (≈63) is called a broadcast packet, and such a packet is distributed to all the nodes connected to the bus.

2. Overall Configuration

The overall configuration of the data transfer control device in accordance with this embodiment of the invention is described below, with reference to FIG. 4.

Figure 4:
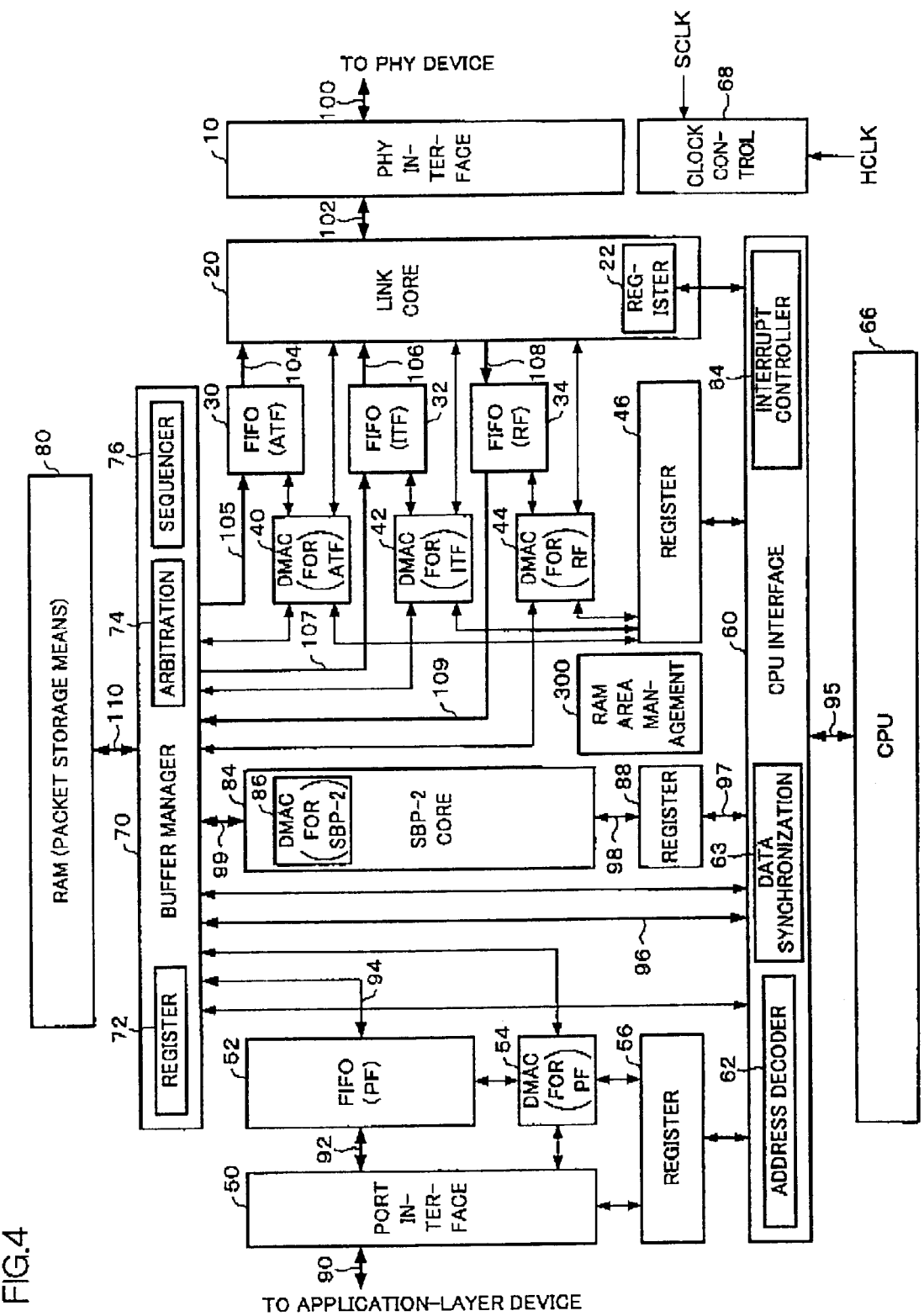
FIG. 4 shows an example of the configuration of a data transfer control device in accordance with an embodiment of the present invention.

In FIG. 4, a PHY interface 10 is a circuit that provides an interface with a PHY device (a physical-layer device).

A link core 20 (link circuit) is a circuit implemented in hardware that provides part of the link layer protocol and the transaction layer protocol; it provides various services relating to packet transfer between nodes. A register 22 is provided for controlling the link core 20 that implements these protocols.

A FIFO (ATF) 30, FIFO (ITF) 32, and FIFO (RF) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO can be no more than three, or no more than two.

A DMAC 40 (read circuit), a DMAC 42 (read circuit), and a DMAC 44 (write circuit) are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with an application-layer device (such as a device for performing print processing for a printer, by way of example). In this embodiment of the invention, the use of this port interface 50 makes it possible to transfer 8-bit data, for example.

A FIFO (PF) 52 is a PIFO used for transferring data between an application-layer device and a DMAC 54 is a DMA controller for PF. A register 56 provides control over the port interface 50 and the DMAC 54.

An SBP-2 core 84 is a circuit that implements part of the SBP-2 protocol by hardware. A register 88 provides control over the SBP-2 core 84. A DMAC (for SBP-2) 86 is a DMA controller for the SBP-2 core 84.

A RAM area management circuit 300 is a circuit for managing the various areas within the RAM 80. When each of the areas within the RAM 80 becomes full or empty, the RAM area management circuit 300 uses various full or empty signals to control the DMACs 40, 42, 44, 54. and 86.

A CPU interface 60 provides an interface with the CPU 66 that controls the data transfer control device. The CPU interface 60 comprises an address decoder 62, a data synchronizer 63, and an interrupt controller 64. A clock controller 68 controls the clock signals used by this embodiment, and SCLK that is sent from the PRY device (PHY chip) and HCLK, which is the master clock, are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

The RAM 80 functions as a randomly accessible packet storage means, where this function is implemented by SRAM, SDRAM, or DRAM or the like.

Note that the RAM 80 is preferably accommodated within the data transfer control device of this embodiment of the invention, but it is possible to attach part or all of the RAM 80 externally.

Figure 5:
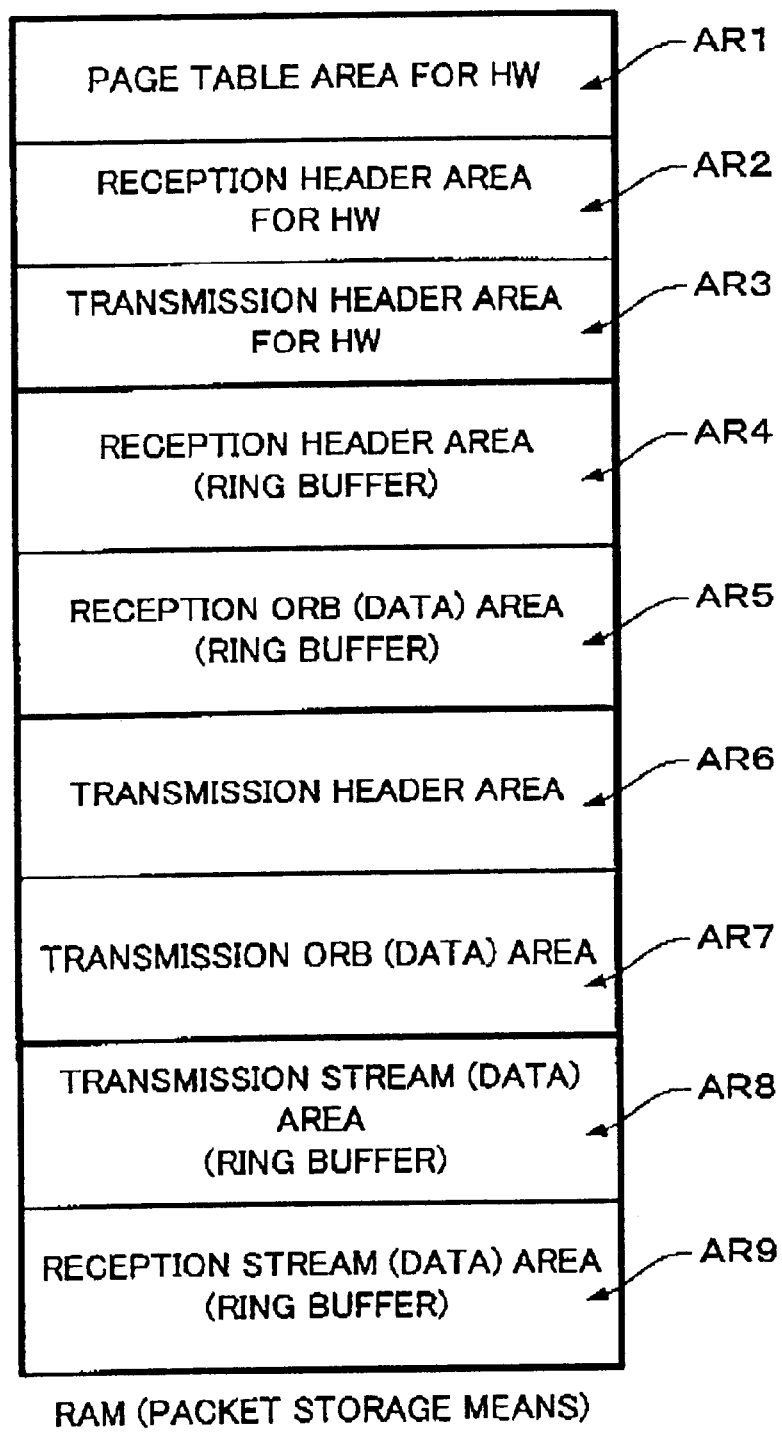
FIG. 5 illustrates a technique of separating (dividing) within a RAM (packet storage means).

An example of the memory map of the RAM 80 is shown in FIG. 5. In this embodiment of the invention as shown in FIG. 5, the RAM 80 is divided into header areas (AR2, AR3, AR4, and AR6) and data areas (AR5, AR7, AR8, and AR9). The header of a packet (broadly speaking, control information) is stored in a header area and the data (ORB and stream) is stored in a data area.

In this embodiment of the invention, the data areas (AR5, AR7, AR8, and AR9) in the RAM 80 are divided into ORB areas (AR5 and AR7) and stream areas (AR8 and AR9), as shown in FIG. 5.

In addition, the RAM 80 in this embodiment is divided into reception areas (AR2, AR4, AR5, and R9) and transmission areas (AR3, AR6, AR7, and ARS).

Note that each ORB (first data for a first layer) is data (commands) conforming to SBP-2 as described above. A stream (second data for a second layer that is above the first layer) is data for the application layer (such as print data for a printer, read or write data for a CD-RW, or image data that has been fetched by a scanner).

A page table area for hardware (HW), a reception header area for HW, and a transmission header area for HW, denoted by AR1, AR2, and AR3, are areas used by the SBP-2 core 84 of FIG. 4 for writing and reading the page table, reception header, and transmission header.

Note that the areas denoted by AR4, AR5, AR8, and AR9 in FIG. 5 form a structure called a ring buffer.

A bus 90 (or buses 92 and 94) shown in FIG. 4 is for connections to applications (a first bus). Another bus 95 (or bus 96), which is for controlling the data transfer control device, is connected electrically to a device (such as a CPU) that controls the data transfer control device as a second bus. Yet another bus 100 (or buses 102, 104, 105, 106, 107, 108, and 109) is for electrical connections to physical-layer devices (such as a PHY device), as a third bus. A further bus 110 (a fourth bus) is for electrical connections to RAM that acts as a randomly accessible storage means. A still further bus 99 (a fifth bus) is for reading and writing header information and page table information, to enable the SBP-2 core 84 to implement SBP-2 by hardware.

The arbitration circuit 74 in the buffer manager 70 arbitrates bus access requests from the DMACs 40, 42, and 44, the CPU interface 60, and the DMACs 86 and 54. Based on the results of this arbitration, a data path is established between one of the buses 105, 107, 109, 96, 99, and 94 and the bus 110 of the RAM 80 (i.e., a data path is established between one of the first, second, third, and fifth buses and the fourth bus).

One feature of this embodiment of the present invention is the way in which it is provided with the RAM 80, which stores packets in a randomly accessible manner, and also the mutually independent buses 90, 96, 99, and 100 as well as the arbitration circuit 74 for connecting one of those buses to the bus 110 of the RAN 80.

Figure 6:
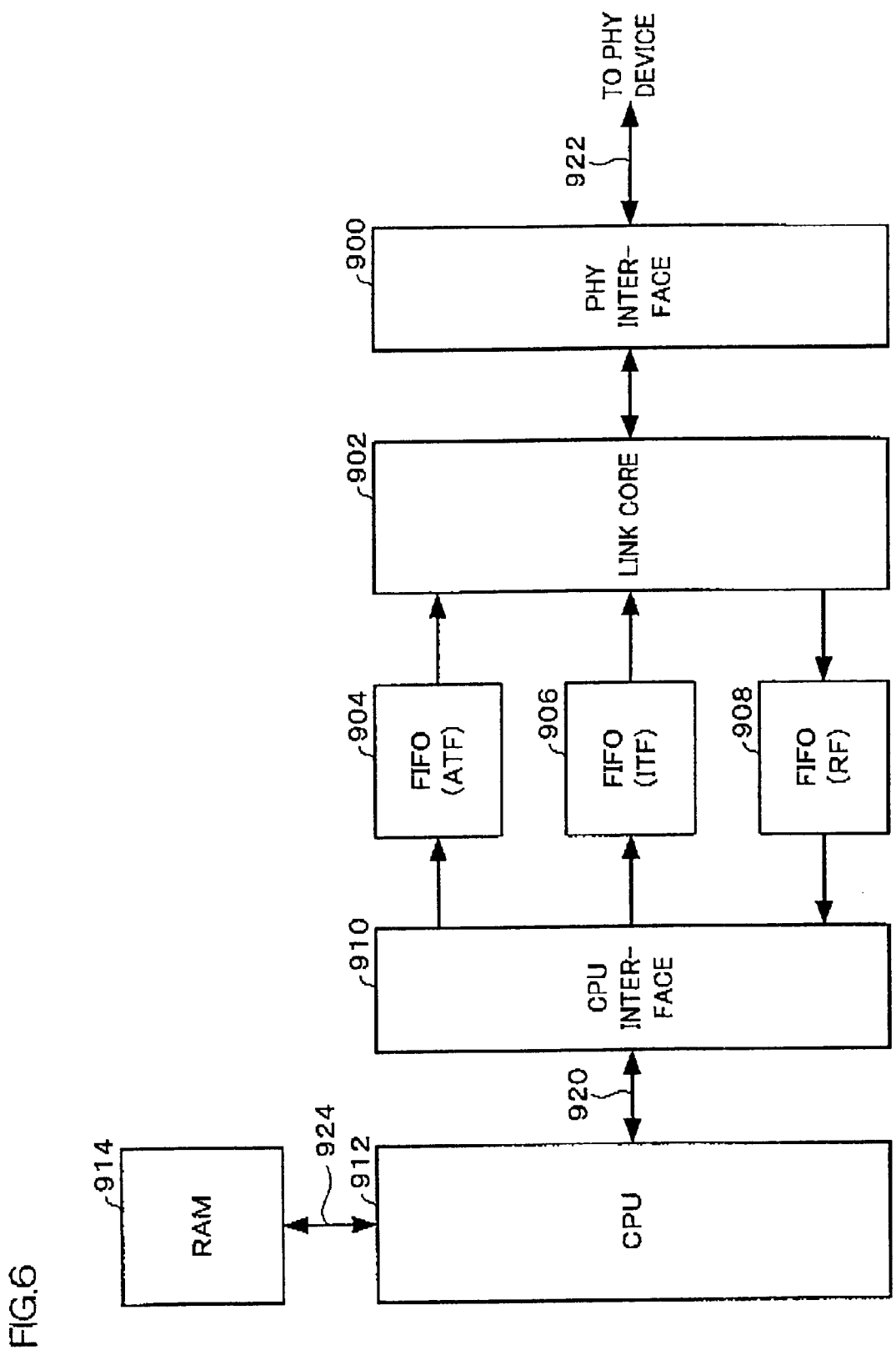
FIG. 6 shows the configuration of a comparative example.

A data transfer control device that has a different configuration from that of this embodiment is shown in FIG. 6, by way of example. In this data transfer control device, a link core 902 is connected to a PHY device by a PHY interface 900 and a bus 922. The link core 902 is connected to a CPU 912 by FIPOs 904, 906, and 908, a CPU interface 910, and a bus 920. The CPU 912 is also connected to a RAM 914, which is local memory in the CPU, by a bus 924.

The method of data transfer used with the data transfer control device configured as shown in FIG. 6 will now be described with reference to FIG. 7. A received packet sent from another node through a PRY device 930 passes through the bus 922, a data transfer control device 932, and the bus 920, then is accepted by the CPU 912. The CPU 912 temporarily writes the accepted received packet to the RAM 914 over the bus 924. The 912 then reads the received packet that has been written to the RAM 914 over the bus 924, processes the received packet into a form that can be used by the application layer, then transfers it to an application-layer device 934 over a bus 926.

When the application-layer device 934 transfers data, on the other hand, the CPU 912 writes this data to the RAM 914. A header is attached to the data in the RAM 914 to create a packet that conforms to IEEE 1394. The thus created packet is sent to another node over the path comprising the data transfer control device 932 and the PHY device 930.

Figure 7:
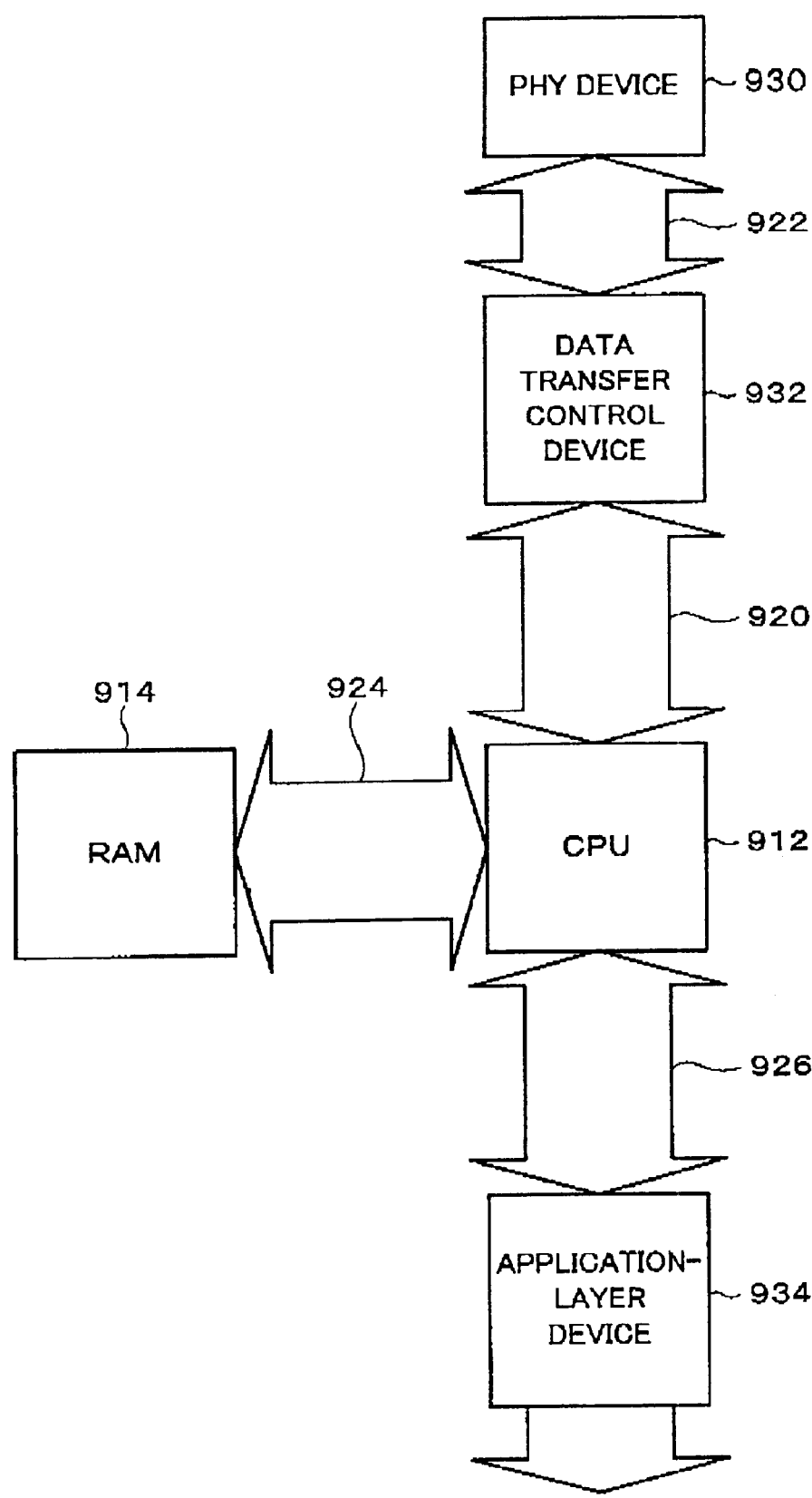
FIG. 7 illustrates the method of data transfer implemented by the configuration of FIG. 6.

However, if the data transfer method of FIG. 7 is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

Figure 8:
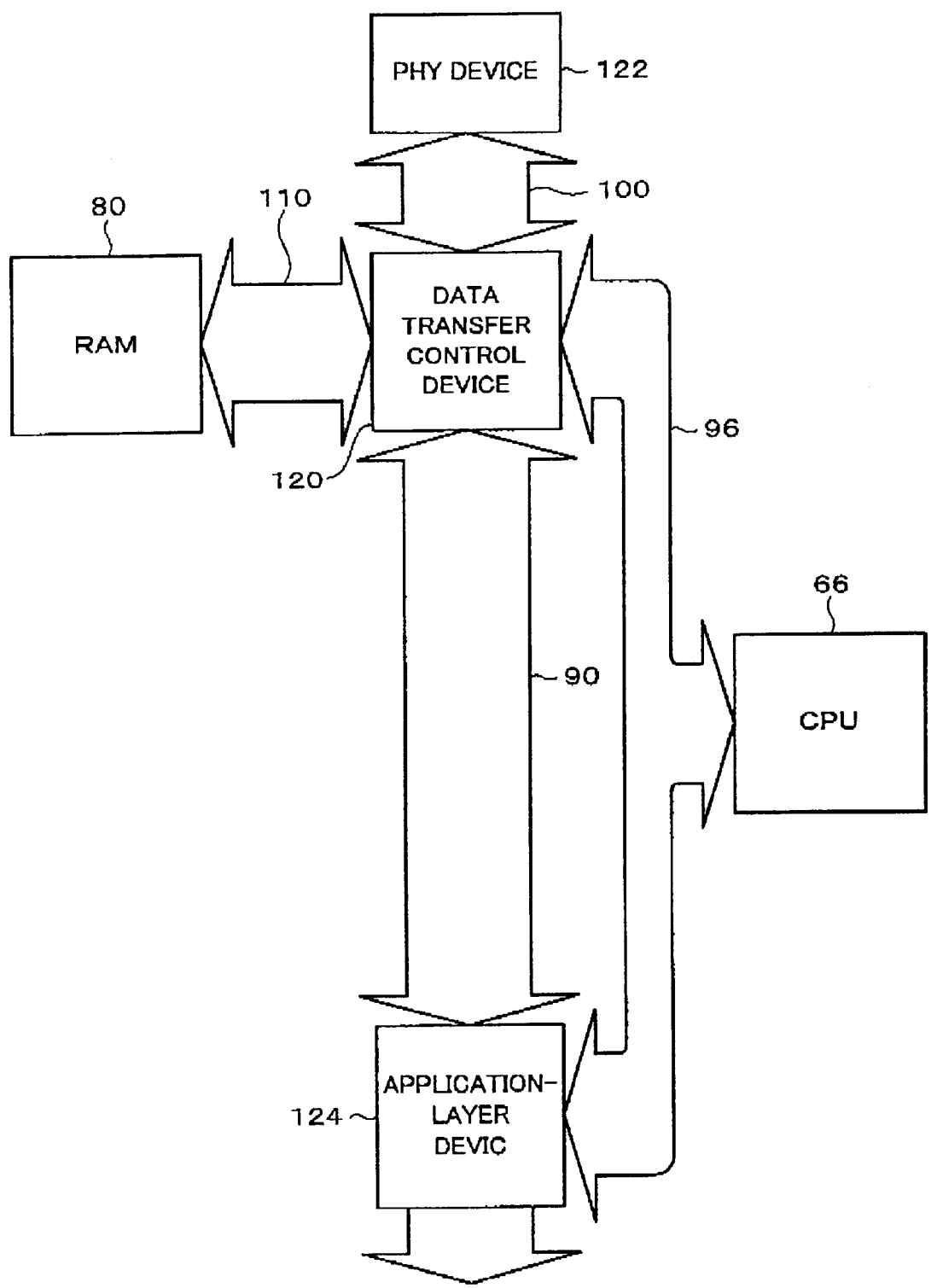
FIG. 8 illustrates the method of data transfer of this embodiment of the present invention.

In contrast thereto, this embodiment of the invention ensures that the bus 90 between a data transfer control device 120 and an application-layer device 124; the CPU bus 96; and the bus 110 between the data transfer control device 120 and the RAM 80 are mutually separated, as shown in FIG. 8. The configuration is therefore such that the CPU bus 96 can be used solely for controlling data transfer. The bus 90 is also dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Detailed Example 3.1 Detailed Configuration of Link Core, FIFO, and DMAC

Figure 9:
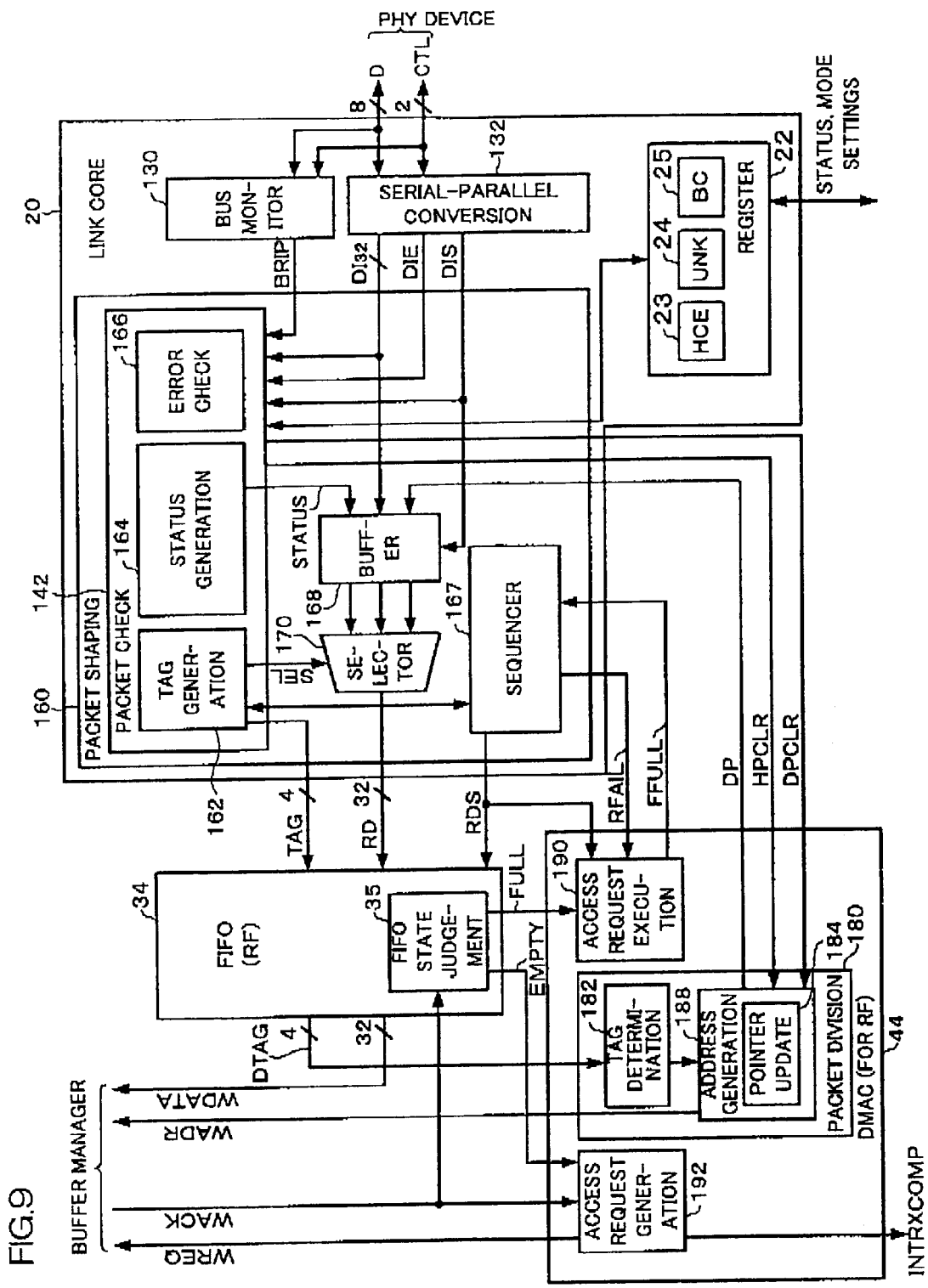
FIG. 9 shows details of the configuration of the link core, DMACs, and FIFOs.

An example of the configuration of the link core 20 (link circuit), a FIFO 34, and the DMAC 44 (write circuit) is shown in FIG. 9.

The link core 20 comprises a bus monitor circuit 130, a serial-parallel conversion circuit 132, a packet shaping (reforming) circuit 160, and the register 22.

The bus monitor circuit 130 in this case monitors an 8-bit wide data bus D and a 2-bit wide control bus CTL that are connected to a PHY device by the PHY interface 10.

The serial-parallel conversion circuit 132 converts the data on the data bus D into 32-bit data.

Figure 10:
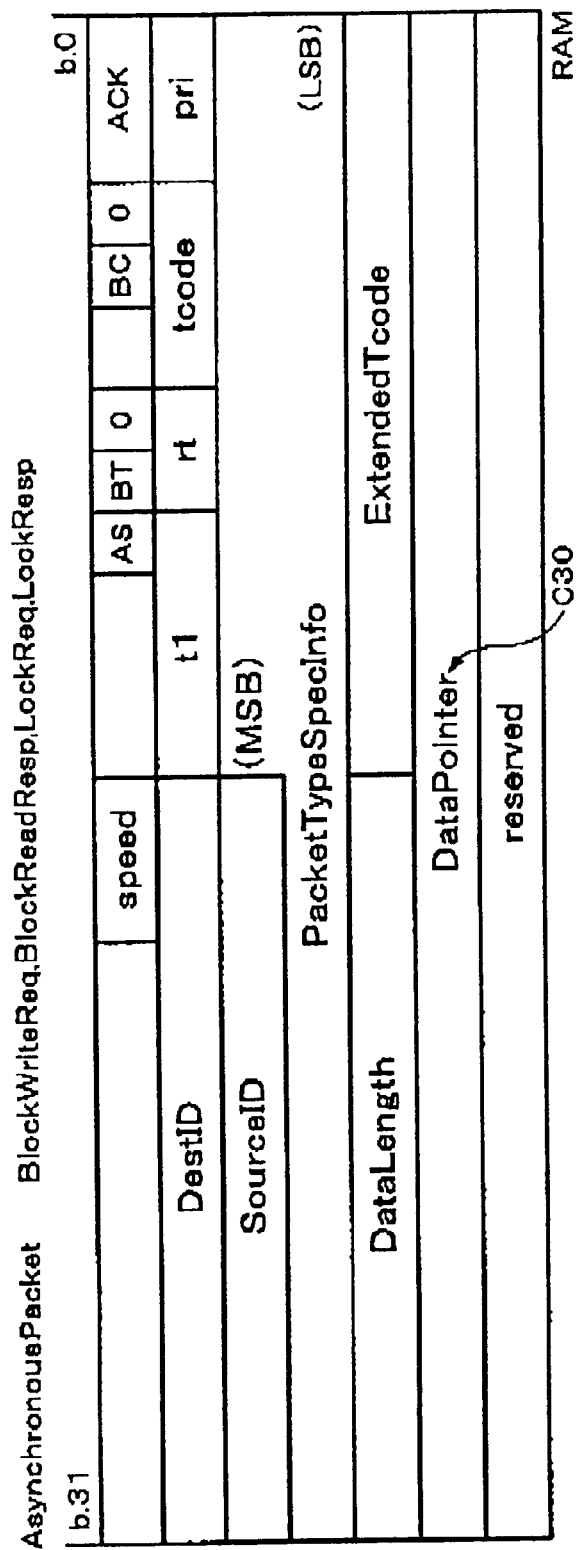
FIG. 10 shows the format of the header portion of a packet stored in RAM and having block data in asynchronous reception.

The packet shaping circuit 160 shapes (reforms) each packet that has been transferred in from another node, into a form that can be used by an upper layer. The format of a packet having block data in asynchronous transfer, in accordance with the IEEE 1394 standard is shown in FIG. 3 by way of example. The format of a header portion (stored in the header area of the RAM 80) of a packet having block data in asynchronous reception is shown in FIG. 10. The thus-configured embodiment of the present invention shapes a packet in the format shown in FIG. 3 into a packet of the format shown in FIG. 10 so that it can be used by an upper layer such as the firmware.

The packet shaping circuit 160 comprises a packet check circuit 142, a sequencer 167, a buffer 168, and a selector 170; and the packet check circuit 142 comprises a TAG generation circuit 162, a status generation circuit 164, and an error check circuit 166.

The packet check circuit 142 in this case is a circuit that diagnoses packets. The TAG generation circuit 162 creates TAG that is information for delimiting the header, data, and other parts of the packets, and the status generation circuit 164 creates various statuses to be added to the packets. The error check circuit 166 performs an error check on packets. It checks the Header CRC and Data CRC of the packet shown in FIG. 3, by way of example. The error check circuit 166 checks DestID and tcode. More specifically, it determines whether or not a received packet is a broadcast packet by checking DestID and whether or not tcode of the received packet in an unknown code (Unktcode).

The sequencer 167 creates various control signals. The buffer 168 and the selector 170 select one of DI from the serial-parallel conversion circuit 132, a status from the packet check circuit 142, or data pointers from the DMAC 44, using a SEL signal from the packet check circuit 142.

The register 22 comprises a register 23 for passing a header CRC error to the firmware and a register24 for informing the firmware that an unknown code (Unktcode) packet has been received. It also comprises a register 25 for setting a first mode in which received broadcast packets are invalidated (destruction mode) and a second mode in which they are validated (passed to the firmware).

The FIFO 34 functions as a buffer for adjusting the phase of RD (which is output data from the link core 20) and the phase of WDATA (which is data to be written to the RAM 80), and it comprises a FIFO state judgement circuit 35. The FIFO state judgement circuit 35 makes an EMPTY signal go active when the FIFO is empty and a FULL signal go active when the FIFO is full.

The DMAC 44 comprises a packet division circuit 180, an access request execution circuit 190, and an access request generation circuit 192.

The packet division circuit 180 in this case divides packets that have been shaped by the packet shaping circuit 160 into data, headers, and other parts, based on the TAG (DTAG), then writes those parts to the various RAM areas (see FIG. 5).

The access request execution circuit 190 executes access requests from the link core 20. When the FULL signal from the FIFO state judgement circuit 35 is active, the access request execution circuit 190 makes a FFULL signal go active. The sequencer 167 within the packet shaping circuit 160 makes RDS, which is a RD (Rxdata) strobe signal, go active on condition that FFULL is not active.

Note that RFAIL is a signal used by the sequencer 167 to inform the access request execution circuit 190 that a reception has failed.

The access request generation circuit 192 issues an access request to the RAM 80. The access request generation circuit is 192 receives WACK (which is a write acknowledgment from the buffer ager 70) and EMPTY from the FIFO state judgement circuit 35, and outputs WREQ (which is a write request) to the buffer manager 70.

3.2 Packet Division and Writing to RAM Areas

The TAG generation circuit 162 generates 4-bit TAG, as shown in FIG. 11. The link core 20 outputs the thus-generated 4-bit TAG to the FIFO 34, while outputting the start (the first quadlet), header, data (ORB and stream) of each packet (see FIG. 3) as RD to the FIFO 34. With this embodiment of the present invention, this TAG is used in packet division and writing to the various areas in RAM (see FIG. 5).

More specifically, a TAG determination circuit 182 shown in FIG. 9 identifies the DTAG (TAG) that are output by the FIFO 34 and determines the write area for the output WDATA of the FIFO 34. A pointer update circuit 184 comprised within the address generation circuit 188 sequentially updates (increments or decrements) the pointers (data pointer and header pointer) in the thus-determined area. The address generation circuit 188 generates an address as indicated by the sequentially updated pointers and outputs it as WADR to the buffer manager 70. This configuration ensures that the header, ORB, and stream of each packet are written to the corresponding areas in RAM, as shown in FIG. 5.

Note that the address generation circuit 188 outputs a data pointer DP (a data pointer for the reception ORB area or a data pointer for the reception stream area) to the packet shaping circuit 160 and the packet shaping circuit 160 embeds this data pointer in the header of the packet (see C30 in FIG. 10). This makes it possible to link each header stored in the header area to the corresponding data stored in the data area.

The description now turns to the TAG (DTAG) of FIG. 11. If the TAG is (0001) or (0010), as shown in FIG. 11 by way of example, the header of the received packet (the output WDATA of the FIFO 34) is written to the reception header area of FIG. 5. Similarly, if the TAG is (0100), the data of the received packet is written to the reception ORB area, or if the TAG is (0101), the data of the received packet is written to the reception stream area.

If the TAG is (1001) or (1010), the header of the received packet is written to the reception header area for hardware (HW). Similarly, if the TAG is (1100), the data of the received packet is written to the reception ORB area for HW, or if the TAG is (1101) the data of the received packet is written to the reception stream area for HW. Note that "for hardware/HW" in this case denotes that it this data for the SBP-2 core 84 of FIG. 4.

3.3 Normal Reception Operation

The operation during normal reception will now be described with reference to the timing waveform chart of FIG. 12.

Figure 12:
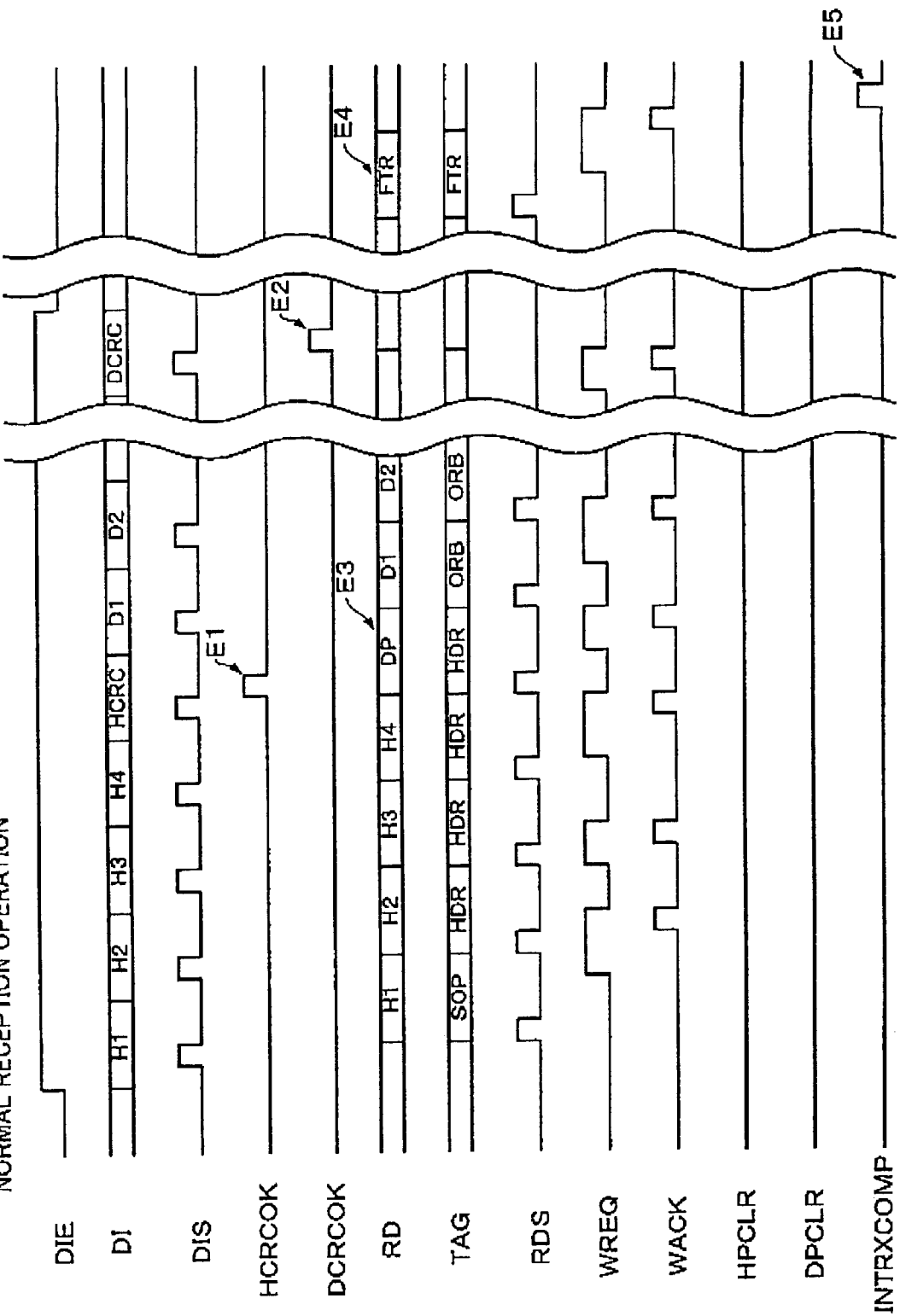
FIG. 12 is a timing waveform chart that illustrates the normal reception operation.

The serial-parallel conversion circuit 132 of FIG. 9 converts 8-bit data from the data bus D into 32-bit data, and outputs it as DI as shown in FIG. 12. A signal DIE indicating whether or not the DI data is valid and a strobe signal determining the timing at which DI is fetched are also output. Note that H1, H2, H3, and H4 of DI in FIG. 12 denote the first, second, third, and fourth quadlets of the header of FIG. 3. Similarly, HCRC denotes the Header CRC of FIG. 3 (fifth quadlet). D1, D2, etc., denote data (in this case, ORB data) and DCRC is the Data CRC of FIG. 3.

The error check circuit 166 of FIG. 9 determines whether or not there is a header CRC error, based on HCRC in DI, and, if there is no header CRC error it makes a signal HCRCOK go active, as shown at E1 in FIG. 12.

The error check circuit 166 also determines whether or not there is a data CRC error, based on DCRC in DI, and, if there is no-data CRC error it makes a signal DCRCOK go active, as shown at E2.

The buffer 168 and the selector 170 receive a status from the packet check circuit 142, DI from the serial-parallel conversion circuit 132, and the data pointer DP from the packet division circuit 180, select one of them, and output it as RD to the FIFO 34. If the data pointer DP is selected at E3 in FIG. 12, by way of example, it is output as RD.

The TAG generation circuit 162 generates the TAG shown in FIG. 11 and outputs the TAG to the FIFO 34 in synchronization with the output of RD. The sequencer 167 outputs the above described RD and a TAG strobe signal RDS to the FIFO 34.

The FIFO 34 receives the TAG, RD, and RDS and outputs DTAG and WDATA. This WDATA is written to the RAM 80 on condition that WACK from the buffer manager 70 has gone active. In other words, a write request WREQ to the RAM 80 is subjected to arbitration by the arbitration circuit 74 of FIG. 4, so that the output timing of RD is not synchronized with the output timings of WREQ and WACK.

If the reception of a packet has been completed, an ACK (ACK packet) is returned to the other node on condition that arbitration on the IEEE 1394 bus has succeeded. The contents of the ACK returned to the other node are inserted into a footer FTR (a status generated by the status generation circuit 164) at E4.

When the footer FTR is written to the RAM 80, an INTRXCOMP event signal goes active, as shown at F5. This INTRXCOMP is input to the interrupt controller 64 of FIG. 4. This posts the completion of the reception to the firmware operating on the CPU 66. On receiving an interrupt, the firmware goes to read the header and data stored in the header and data areas of the RAM 80.

3.4 Header CRC Error

Figure 13:
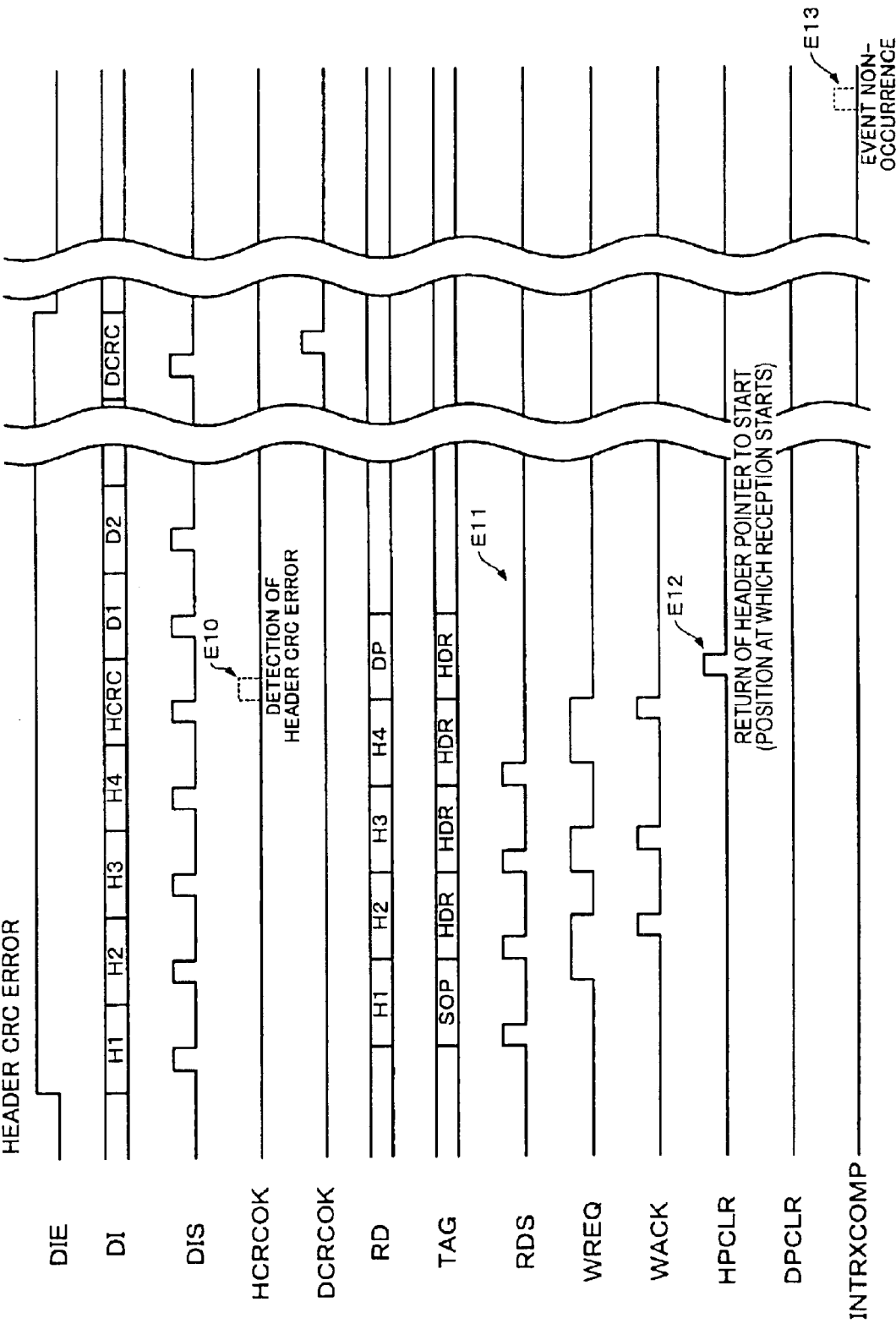
FIG. 13 is a timing waveform chart that illustrates the reception operation when a header CRC error occurs.

A waveform chart of the timing at which a header CRC error is detected is shown in FIG. 13. If a CRC error occurs in the header of a packet in accordance with this embodiment of the present invention, the packet is invalidated to ensure that that packet is not passed to the firmware.

If a header CRC error is detected by the error check circuit 166, HCRCOK does not go high (active) at the timing shown at E10 in FIG. 13 and remains low (inactive). When that happens, the strobe signal RDS is fixed at low and the processing for writing the packet to the RAN 80 is interrupted. A signal HPCLR for clearing the header pointer then goes active, as shown at E12. An INTRXCOMP event does not occur, as shown at E13.

Figure 14:
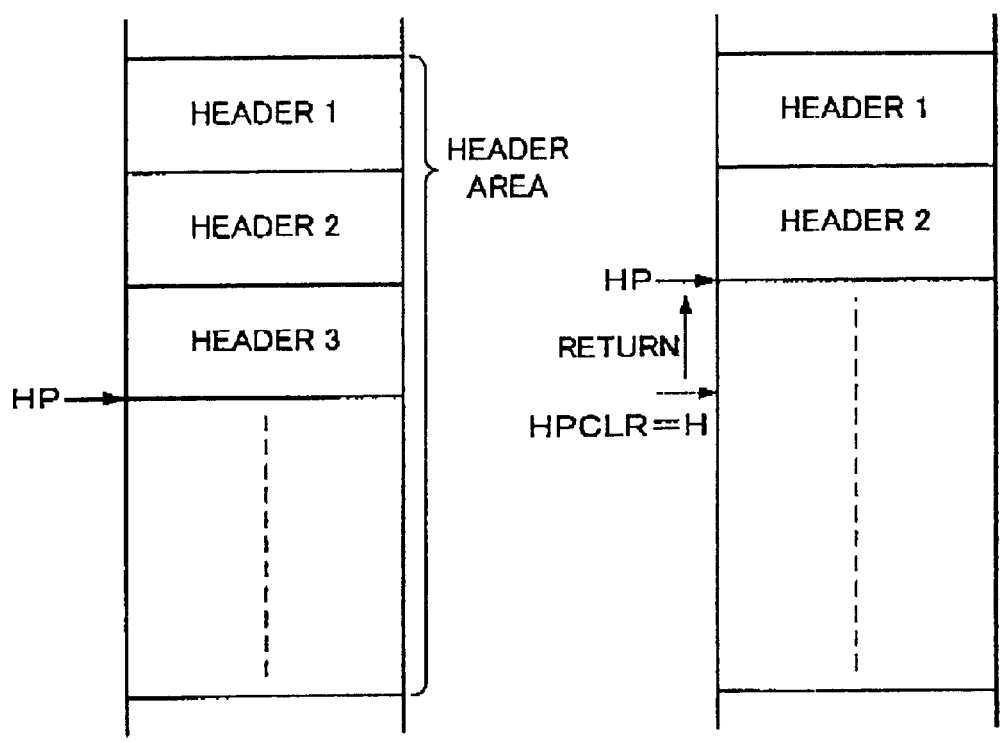
FIG. 14 illustrates a method of returning a header pointer to a previous position when there is a header CRC error.

The signal HPCLR is input to the address generation circuit 188 of FIG. 9. When HPCLR goes active, the pointer update circuit 184 of the address generation circuit 188 returns a header pointer HP which is a pointer indicating a received header position (indicating a post-header position) in the header area to the position that was indicated by HP at the time at which reception of the previous packet was completed, as shown in FIG. 14. This ensures that a header in which a header CRC error was detected (a header 3) is not saved.

In other words, since it is impossible to analyze a header CRC error even if one is detected, there is no point in transferring that header to the firmware. If a header CRC error is detected in this embodiment of the present invention, that header is invalidated and is not passed to the firmware, in order to reduce the processing load on the firmware. If a header CRC error occurs, as shown at E13 in FIG. 13 by way of example, no reception completed event INTRXCOMP occurs and no interrupt is sent to the CPU either. The fact that a packet has been receives is therefore not passed to the firmware. Since the header pointer HP is returned to its previous position, as shown in FIG. 14, the header in which the header CRC error is detected is not saved by the firmware. This simplifies the reception-related processing of the firmware and helps reduce the size of the device. The time required for processing when a header CRC error occurs can be saves, which tends to increase the data transfer speed.

Note that if the configuration is such that FIFOs are used as the packet storage means instead of RAM, as shown in FIG. 6, it is not possible to invalidate the first to fourth quadlets of the header, which have already been input to the FIFOs at the point at which the header CRC error is detected. The firmware therefore has no option but to accept that packet. It is thus not possible to reduce the processing load on the firmware.

In contrast thereto, the randomly accessible RAM 80 is used as a packet storage means in this embodiment of the present invention. It is therefore possible to invalidate a packet by a method such as returning the header pointer to a previous position, by way of example. As a result, the firmware does not have to accept that packet and thus the processing load on the firmware can be reduced.

Note that if a header CRC error has been detected by this embodiment of the invention, a status HCE indicating that a header CRC error has been detected is written to the register 23 of FIG. 9 (a register that can be read by the firmware). With such a configuration, it is possible to pass that status HCE to the firmware, if it is necessary for the firmware to know that a header CRC error has been detected, for some reason.

3.5 Unktcode

Figure 15:
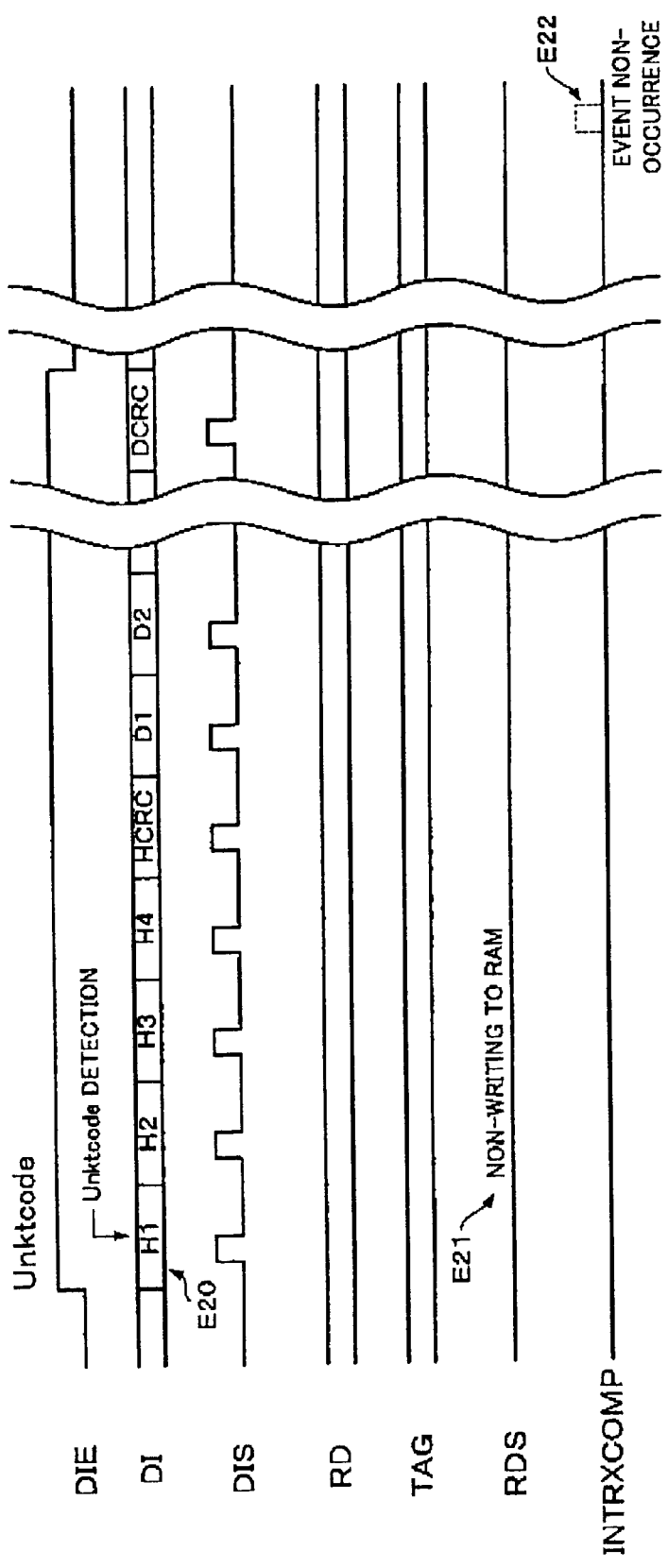
FIG. 15 is a timing waveform chart that illustrates the reception operation when Unktcode occurs.

A timing waveform chart of the operation if tcode is an unknown code (Unktcode) is shown in FIG. 15. If it is determined by this embodiment of the present invention that tcode is Unktcode, that packet is invalidated to ensure that it is not passed on to the firmware.

In other words, if the error check circuit 166 detects Unktcode with the first quadlet of the header, as shown at E20 in FIG. 15. the strobe signal RDS is fixed at low (inactive), as shown at E21. This ensures that the packet is not written to the RAM 80. In other words, this handling is similar to that of a packet addressed to another node. An INTRXCOMP event does not occur, as shown at E22.

This means that if Unktcode, tdode of that packet is unclear. If tcode is not clear, it is not possible to determine the size of the header, nor is it possible to determine the position of the Header CRC. Therefore, any processing done after Unktcode is detected would be completely meaningless, 80 it is not necessary to pass that header on to the firmware. If Unktcode is detected by this embodiment of the invention, that header is not written to RAM, in order to reduce the processing load on the firmware. This makes it unnecessary for the firmware to perform any Unktcode-related processing, which tends to increase the data transfer speed.

Note that this embodiment of the present invention is configured in such a manner that a status UNK that indicates the reception of an unknown code packet is written to the register 24 of FIG. 9 (a register that can be read by the firmware). With such a configuration, it is possible to pass that status UNK to the firmware, if it is necessary for the firmware to know that a packet with an unknown code has been received, for some reason.

3.6 Data CRC Error

Figure 16:
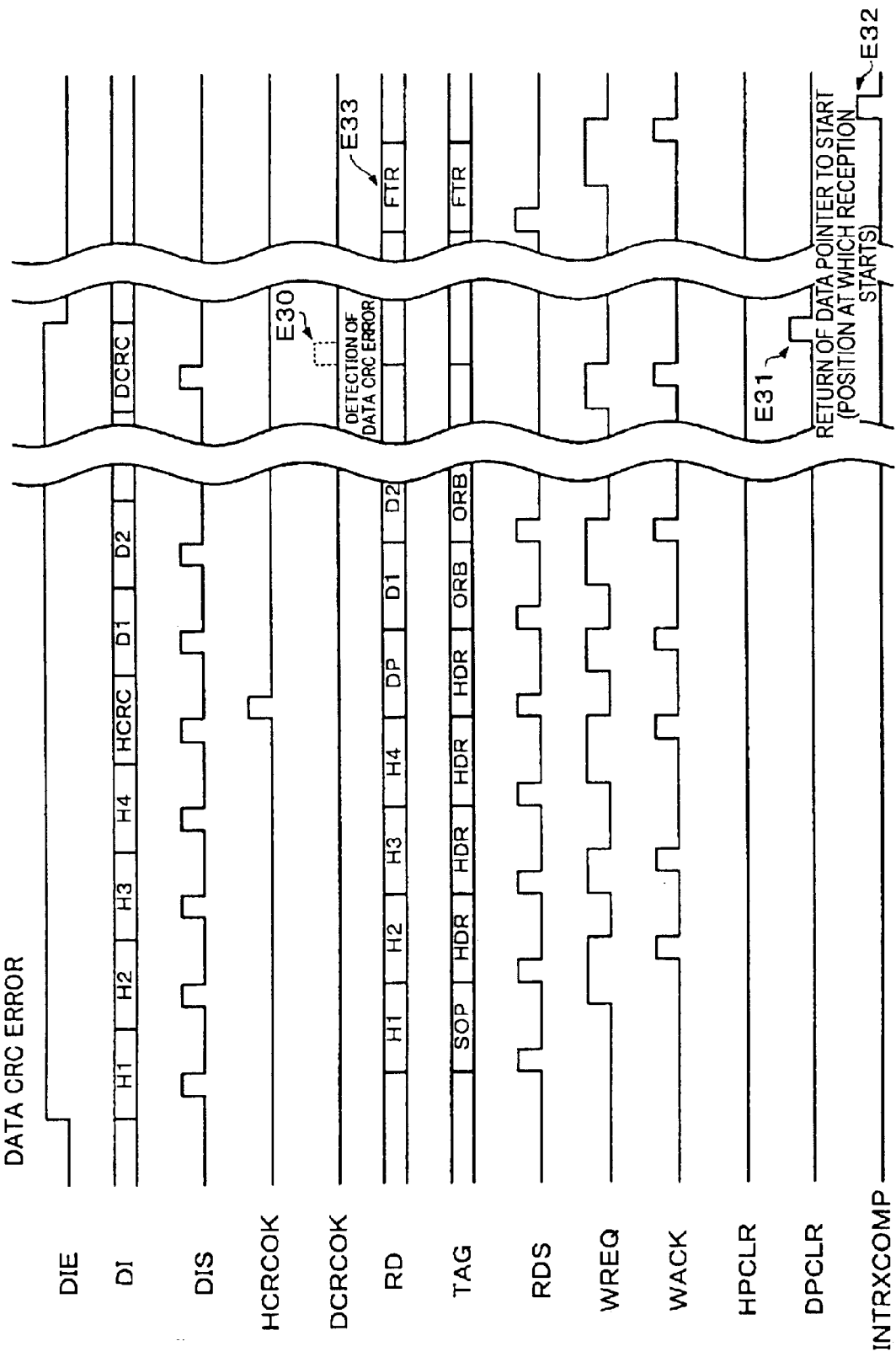
FIG. 16 is a timing waveform chart that illustrates the reception operation when there is a data CRC error.

A timing waveform chart of the operation when a data CRC error is detected is shown in FIG. 16. If a data CRC error is detected by this embodiment of the invention, the header of that packet is validated but the data of that packet is invalidated.

If a data CRC error is detected by the error check circuit 166, DCRCOK does not go high at the timing shown at E30 in FIG. 16, but remains low (inactive). When that happens, a signal DPCLR that clears the data pointer goes active, as shown at E31.

Note that an INTRXCOMP event is generated in that case, as shown at E32. In addition, an ACK data error packet is returned to the other node (information indicating the return of an ACK data error is inserted into the footer FTR at E33).

Figure 17:
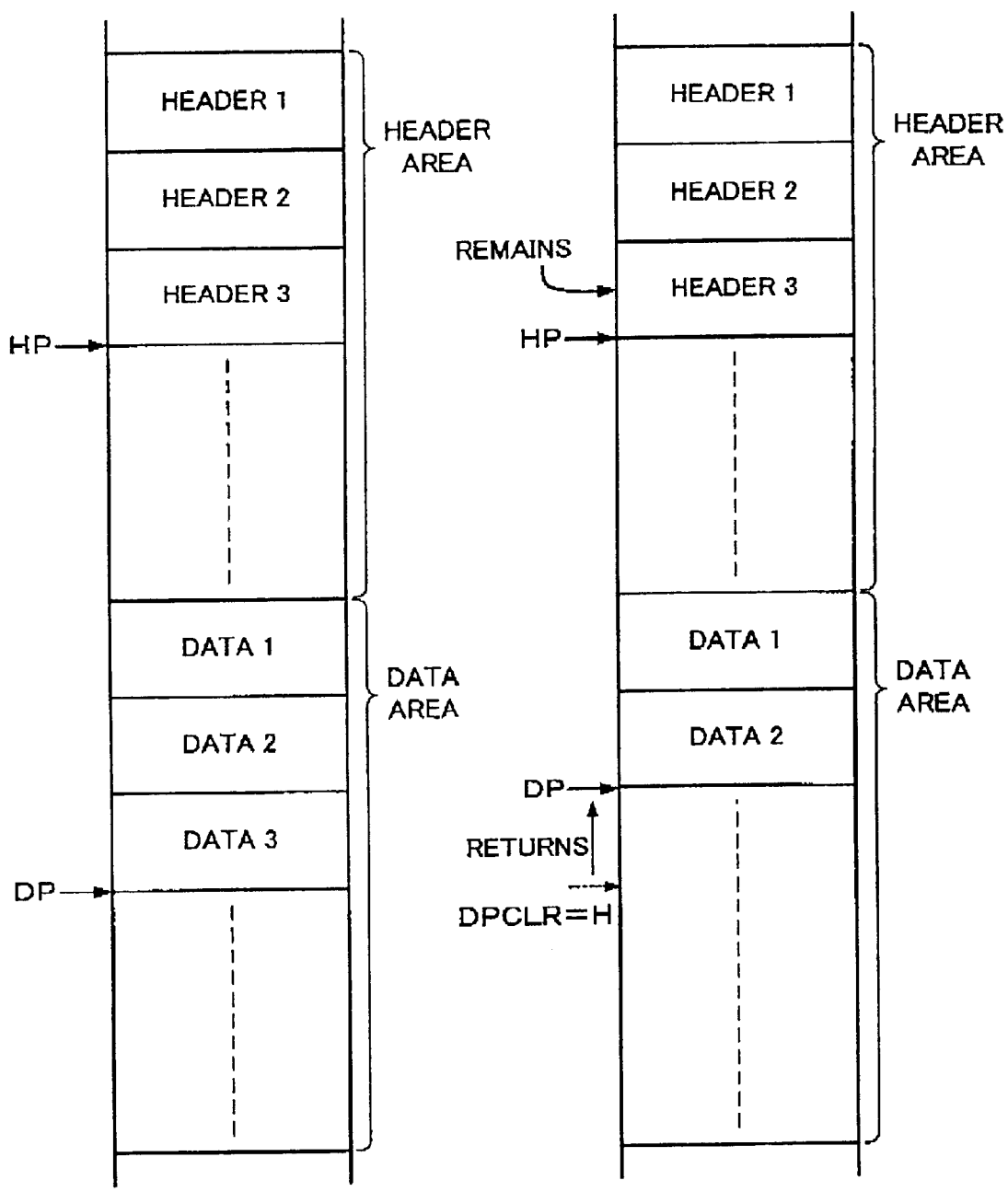
FIG. 17 illustrates a method of returning a data pointer to a previous position when there is a data CRC error.

The signal DPCLR is input to the address generation circuit 188 of FIG. 9. If DPCLR becomes active, the pointer update circuit 184 of the address generation circuit 188 returns the data pointer DP which is a pointer indicating a received data position (indicating post-data position) in the data area shown in FIG. 17 to the position indicated by DP when the reception of the previous packet was completed. This ensures that the data of a packet in which a data CRC error was detected (data 3) is not saved.

In contrast to the case shown in FIG. 14, the header pointer HP is not changed so that the header (the header 3) remains. It is therefore possible for the firmware to read that header.

In other words, since it is impossible to analyze the data if a data CRC error occurs, there is no point in transferring that data to the firmware. The data of the packet in which the data CRC error was detected can therefore be canceled by returning the data pointer DP of FIG. 17 to its previous position. This makes it unnecessary to calculate addresses based on the data pointer and the data length, reducing the processing load on the firmware.

However, since the header could be used by the firmware, it is held without being canceled. If a data CRC error has occurred, it may be necessary to perform processing such as that of issuing a transaction to prompt the retransmission of the packet, so it is necessary to ensure that the firmware can analyze the header of the packet in which the data CRC error occurred. In other words, it is possible for the firmware to determine details such as the SourceID, tcode, and transaction label t1, by analyzing that header. As a result, the firmware can execute whichever transaction processing is appropriate when a data CRC error has occurred.

3.7 Broadcast Packets

The protocol used with the SEP-2 that was described with reference to FIG. 2 basically does not use broadcast packets. This is because data transfer between the initiator and the target under SBP-2 is done in a peer-to-peer fashion.

If the data transfer control device is being designed for the SBP-2, therefore, it is preferable that the reception of broadcast packets can be invalidated, in order to reduce the processing load on the firmware.

With this embodiment of the present invention, the configuration is such that a first mode in which received broadcast packets are invalidated (a mode in which broadcast packets are canceled) and a second mode in which they are validated (a mode in which they are passed on to the firmware) can be set by using the register 25 in FIG. 9 (a firmware setting).

Figure 18:
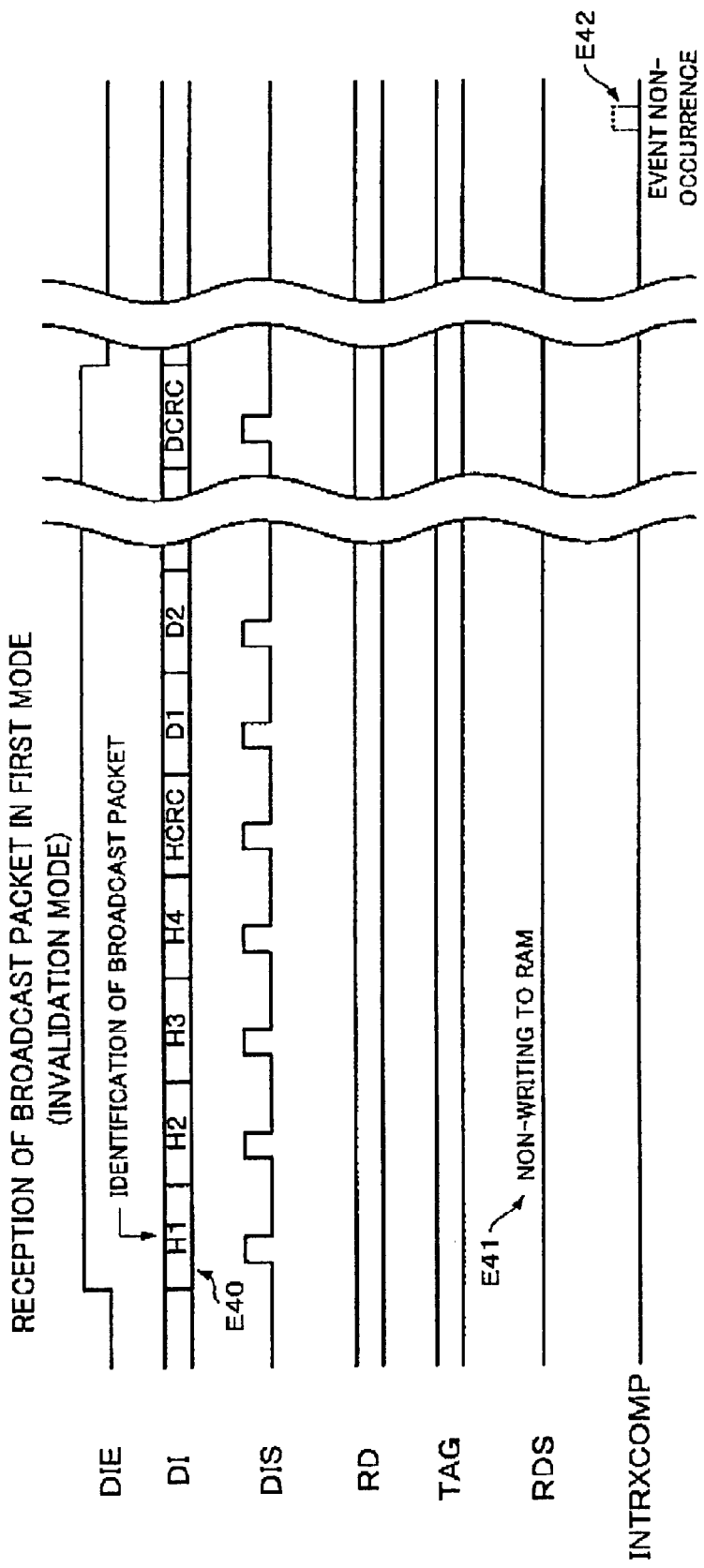
FIG. 18 is a timing waveform chart that illustrates the operation when a broadcast packet is received in the first mode.

A timing waveform chart of the operation when a broadcast packet is received in the first mode is shown in FIG. 18. If a broadcast packet is received in the first mode by this embodiment of the invention, that packet is invalidated to ensure that it is not passed to the firmware.

In other words, the error check circuit 166 determines whether or not a received packet is a broadcast packet from DestID in the first quadlet of the header, as shown at E40 in FIG. 18. If it is determined to be a broadcast packet (if 0×3F is found), the strobe signal RDS is held low (inactive), as shown at E41. This ensures that the packet is not written to the RAM 80. In other words, this handling is similar to that of a packet addressed to another node. An INTRXCOMP event does not occur, as shown at E42. This can be seen as causing the received broadcast packet to cease to exist, making it unnecessary for the firmware to perform broadcast-related processing. This tends to increase the data transfer speed of a data transfer control device that is designed for SBP-2.

Note that if a broadcast packet is received in the second mode in which broadcast packets are validated, the normal reception operation described with reference to FIG. 12 occurs.

3.8 Firmware Processing

The description now turns to how the processing of the firmware is reduced by the method of this embodiment of the present invention.

A flowchart of the processing performed by the firmware in a comparative example that does not use the method of this embodiment of the invention is shown in FIG. 19A and a flowchart of the processing performed by the firmware according to this embodiment is shown in FIG. 19B.

First of all, the header is read from the storage means (step S1). The tcode within the header is analyzed and processing ends if it is an unknown tcode (steps S2 and S3). The Header CRC comprised within the header is then analyzed and processing ends if there is a header CRC error (steps S4 and S5). The DestID within the header is then analyzed and processing ends if the received packet is a broadcast packet (steps S6 and S7). The flow moves on to packet processing (step S8).

With this embodiment of the invention, on the other hand, the firmware moves directly to packet processing as shown in FIG. 19B, immediately after reading the header (steps S11 and S12). In other words, the processing of steps S2 to S7 of FIG. 19A becomes unnecessary. This enables a dramatic decrease in the processing load on the firmware, thus enabling an increase in the data transfer speed.

Figure 20A:
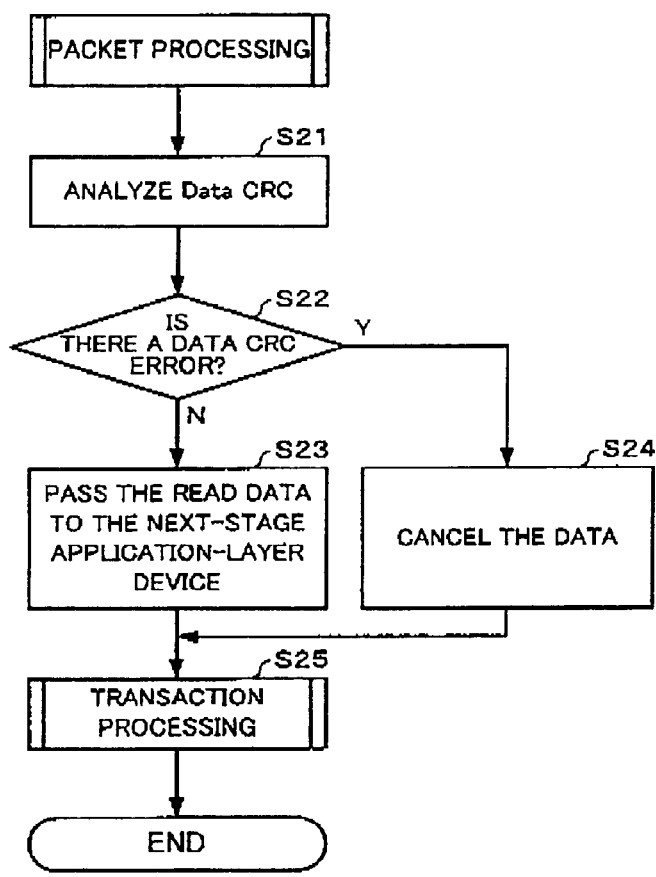
FIGS. 20A and 20B are also flowcharts of the processing performed by the firmware in a comparative example and this embodiment of the invention.
Figure 20B:
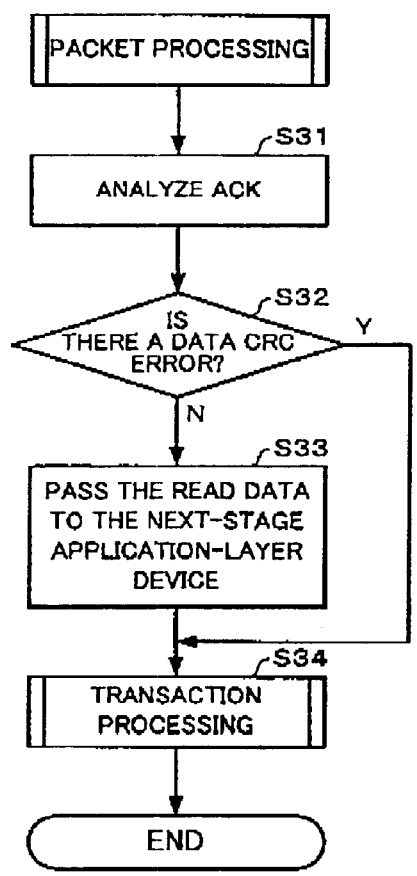

A flowchart of the packet processing performed by the firmware in the comparative example is shown in FIG. 20A and a flowchart of the packet processing performed by the firmware in accordance with this embodiment of the present invention is shown in FIG. 20B.

In the comparative example of FIG. 20A, the firmware first analyzes the Data CRC to determine whether or not there is a data CRC error (steps S21 and S22). If there is no data CRC error, the read data is passed to the next-stage application-layer device and the flow proceeds to transaction processing (steps S23 and S25). If there is a data CRC error, on the other hand, the data of that packet is cancelled and flow proceeds to transaction processing (steps S24 and S25).

In this embodiment shown in FIG. 20B, the firmware first analyzes ACK that is comprised within the header (or footer FTR) of the received packet, to determine whether or not there is a data CRC error (steps S31 and S32). If there is no data CRC error, the read data is passed to the next-stage application-layer device and flow proceeds to transaction processing (steps S33 and S34). If there is a data CRC error, on the other hand, the flow proceeds directly to transaction processing (step S35).

In this manner, this embodiment of the invention makes it unnecessary to perform the processing for canceling data at step S24 of FIG. 20A. This data-destruction processing necessitates steps such as the calculation of addresses from the data pointer and data length, so places a heavy load on the firmware. With this embodiment of the invention, this address calculation is not necessary, which enables a dramatic reduction in the processing load on the firmware.

4. Electronic Equipment

The description now turns to examples of electronic equipment comprising the data transfer control device of this embodiment of the invention.

Figure 21A:
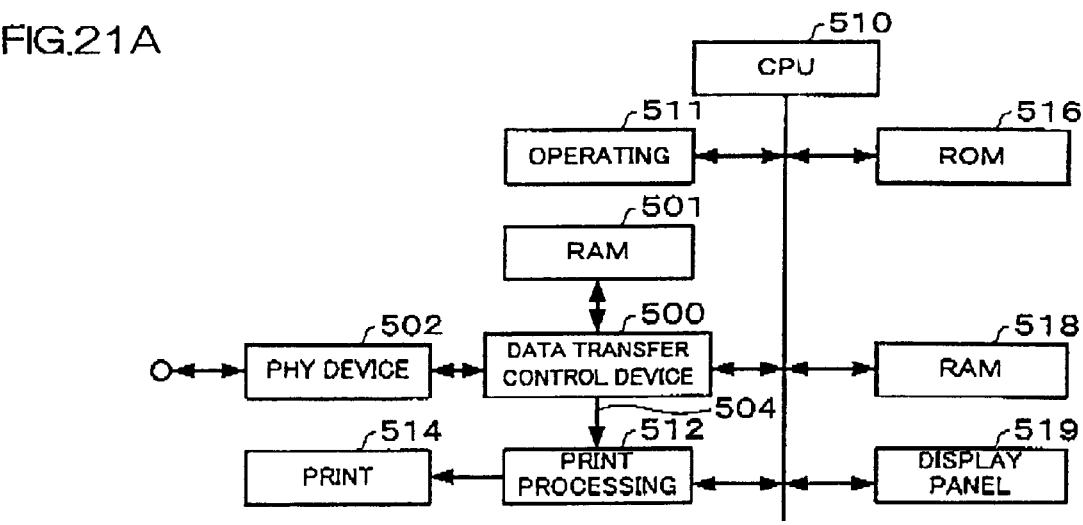
FIGS. 21A, 21B, and 21C show examples of the internal block diagrams of various items of electronic equipment.
Figure 22A:
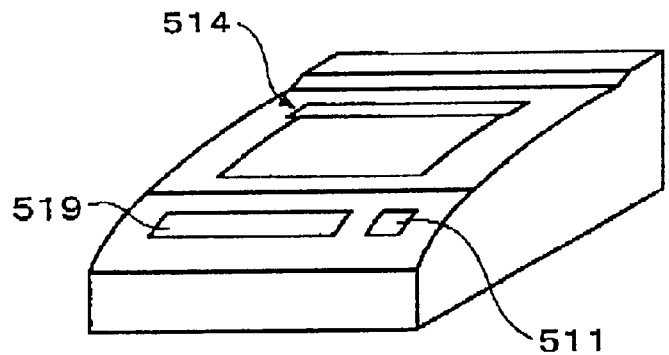
FIGS. 22A, 22B, and 22C show external views of various items of electronic equipment.

An internal block diagram of a printer that is one example of such electronic equipment is shown in FIG. 21A with an external view thereof being shown in FIG. 22A. A CPU (microcomputer) 510 has various functions, including that of controlling the entire system. An operating section 511 is designed to allow the user to operate the printer. Data such as a control program and fonts is stored in a ROM 516. and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 over a bus 504. The print data is subjected to given processing by the print processing section 512 and is output for printing to paper by a print section (a device for outputting data) 514 comprising components such as a print head.

Figure 21B:
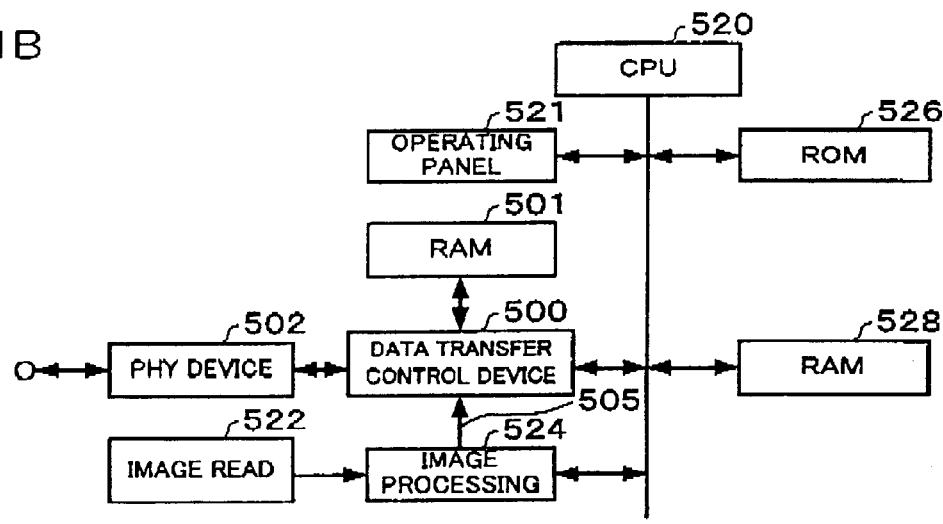
Figure 22B:
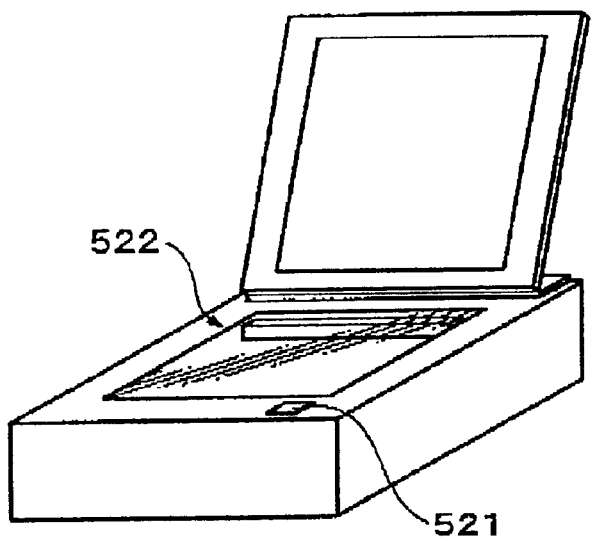

An internal block diagram of a scanner that is another example of electronic equipment is shown in FIG. 21B with an external view thereof being shown in FIG. 22B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY device 502 to another node such as a personal computer.

Figure 21C:
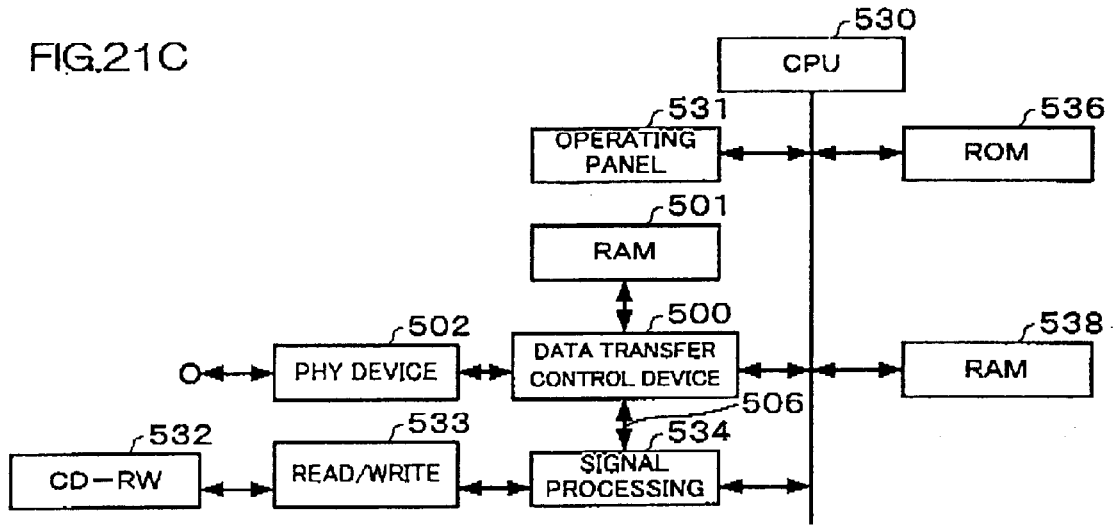
Figure 22C:
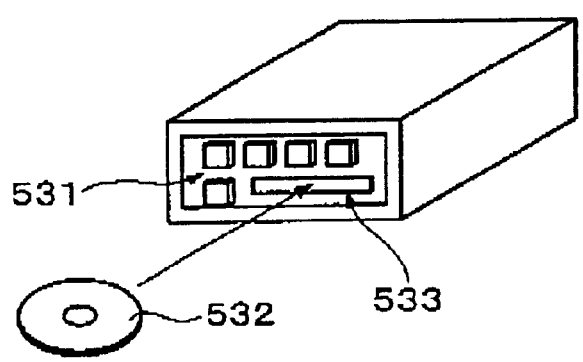

An internal block diagram of a CD-RW drive that is a further example of electronic equipment is shown in FIG. 21C with an external view thereof being shown in FIG. 22C. A CPU 530 has various functions, including that of controlling the entire system. An operating section 531 is designed to allow the user to operate the CD-RW. Data such as a control program is stored in a RON 536 and a RAM 538 functions as a work area for the CPU 530.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by the read/write section 533 into the CD-RW 532.

Note that a separate CPU for providing data transfer control with respect to the data transfer control device 500 could be provided in addition to the CPU 510, 520, or 530 of FIG. 22A, 22B, or 22C.

In addition, a RAM 501 (equivalent to the RAM 80 of FIG. 4) is shown provided outside the data transfer control device 500 in FIGS. 22A, 22B, and 22C, but the RAM 501 could equally well be provided within the data transfer control device 500.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses. This also enables reductions in the cost and size of the data transfer control device, thus reducing the cost and size of the electronic equipment.

Note that the electronic equipment that can employ a data transfer control device according to the present invention is not limited to the above described embodiments, and thus various other examples can be considered, such as various types of optical disk drive (CD-ROM or DVD), magneto-optic disk drives (Mo), hard disk drives, TVs, VTRs, video cameras, audio equipment, telephones, projectors, personal computers, is electronic organizers, and dedicated wordprocessors.

Note also that the present invention is not limited to the embodiments described herein, and various modifications are possible within the scope of the invention as laid out herein.

For example, the configuration of the data transfer control device in accordance with the present invention is preferably that as shown in FIG. 4, but it is not limited thereto.

It is particularly preferable that the methods of invalidating the header or data of a packet are as described with reference to this embodiment of the present invention, but they are not limited thereto.

The present invention can also be applied to data transfer in accordance with standards that are that are developed from IEEE 1394, provided they are at least based on the concept of IEEE 1394.

What is claimed is:

1. A data transfer control device for performing data transfer in accordance with the IEEE 1394 standard between a plurality of nodes connected to a bus, the data transfer control device comprising:

a link circuit that provides a service for packet transfer between the nodes; and a write circuit that writes a packet, which has been received through the link circuit, to a packet storage memory which is randomly accessible, wherein the link circuit performs processing to check a header CRC or a transaction code included within the header of the packet received from another node and, performs processing to invalidate the packet when it is determined that there is a CRC error in the header of the packet or when it is determined that the transaction code of the packet is an unknown code, wherein the packet storage memory is divided into a header area and a data area, wherein the write circuit writes the header of the packet to the header area of the packet storage memory and the data of the packet to the data area of the packet storage memory, wherein when it is determined that there is the CRC error in the header of the packet, the packet is invalidated by returning a header pointer indicating a received header position within the header area of the packet storage memory to a position indicated by the header pointer at a completion of a previous packet reception.

2. The data transfer control device as defined in claim 1, further comprising:

a resister which stores status information indicating that the header CRC error has occurred.

3. The data transfer control device as defined in claim 1, further comprising:

a register which stores status information indicating that the packet with an unknown code has been received.

4. The data transfer control device as defined in claim 1, wherein when it is determined that the transaction code of the packet is an unknown code, the packet is invalidated by ensuring that the packet is not written to the packet storage memory.

5. The data transfer control device as defined in claim 1, further comprising:

a status generation circuit that generates reception completed status when it is determined that there is not the CRC error in the header of the packet or when it is determined that the transaction code of the packet is a known code, and generates no reception completed status when it is determined that there is the CRC error in the header of the packet or when it is determined that the transaction code of the packet is an unknown code.

6. Electronic equipment comprising:

the data transfer control device according to claim 1;

a device which performs given processing on data that has been received from another node through the data transfer control device and a bus; and a device for outputting or storing data that has been subjected to processing.

7. Electronic equipment comprising: the data transfer control device according to claim 1;

a device which performs given processing on data that is to be transferred to another node through the data transfer control device and a bus; and a device which takes in data to be subjected to processing.

8. A data transfer control device for performing data transfer in accordance with the IEEE 1394 standard between a plurality of nodes connected to a bus, the data transfer control device comprising:

a link circuit that provides a service for packet transfer between the nodes; and a write circuit that writes a packet, which has been received through the link circuit, to a packet storage memory which is randomly accessible, wherein the link circuit performs processing to check a data CRC included within data of the packet received from another node and, performs processing to validate the header of the packet and invalidate the data of the packet when it is determined that there is a CRC error in the data of the packet, wherein the packet storage memory is divided into a header area and a data area, wherein the write circuit writes the header of the packet to the header area of the packet storage memory and the data of the packet to the data area of the packet storage memory, wherein when it is determined that there is the CRC error in data of the packet, the data is invalidated by returning a data pointer indicating a received data position within the data area of the packet storage memory, to a position indicated by the data pointer at a completion of a previous packet reception without returning a header pointer indicating a received header position within the header area of the packet storage memory.

9. Electronic equipment comprising: the data transfer control device according to claim 8;

a device which performs given processing on data that has been received from another node through the data transfer control device and a bus; and a device for outputting or storing data that has been subjected to processing.

10. Electronic equipment comprising: the data transfer control device according to claim 8, a device which performs given processing on data that is to be transferred to another node through the data transfer control device and a bus; and a device which takes in data to be subjected to processing.

11. A data transfer control device for performing data transfer in accordance with the IEEE 1394 standard between a plurality of nodes connected to a bus, the data transfer control device comprising:

a link circuit that provides a service for packet transfer between the nodes;

a write circuit that writes a packet, which has been received through the link circuit, to a packet storage memory which is randomly accessible; and a register for setting a first mode, in which a received broadcast packet is invalidated, and a second mode, in which the received broadcast packet is validated, wherein the link circuit performs processing to check a destination ID included in a header of the packet received from another node and, performs processing to invalidate the packet when it is determined that the packet is the broadcast packet and the first mode has been set, wherein when it is determined that the packet is the broadcast packet and the first mode has been set, the packet is invalidated by not writing the packet to the packet storage memory.

12. Electronic equipment comprising: the data transfer control device according to claim 11, a device which performs given processing on data that has been received from another node through the data transfer control device and a bus; and a device for outputting or storing data that has been subjected to processing.

13. Electronic equipment comprising: the data transfer control device according to claim 11;

a device which performs given processing on data that is to be transferred to another node through the data transfer control device and a bus; and a device which takes in data to be subjected to processing.

* * * * *

UNITED STATES PATENT AND TRADEMARK OFFICE
CERTIFICATE OF CORRECTION

PATENT NO. : 6,725,413 B1
DATED : April 20, 2004
INVENTOR(S) : Takuya Ishida

It is certified that error appears in the above-identified patent and that said Letters Patent is hereby corrected as shown below:

Title page,
Item [56], References Cited, FOREIGN PATENT DOCUMENTS, add the following:
-- JP    A2-244941    9/1990 --

Signed and Sealed this

Twenty-third Day of November, 2004

JON W. DUDAS
*Director of the United States Patent and Trademark Office*